(12) United States Patent
Kordasiewicz et al.

(10) Patent No.: US 9,191,284 B2
(45) Date of Patent: Nov. 17, 2015

(54) METHODS AND APPARATUS FOR PROVIDING A MEDIA STREAM QUALITY SIGNAL

(75) Inventors: Roman Kordasiewicz, Elmira (CA); Anthony Joch, Waterloo (CA); Kevin Goertz, Waterloo (CA); Michael Gallant, Kitchener (CA)

(73) Assignee: Avvasi Inc., Waterloo (CA)

( * ) Notice: Subject to any disclaimer, the term of this patent is extended or adjusted under 35 U.S.C. 154(b) by 348 days.

(21) Appl. No.: 13/283,898

(22) Filed: Oct. 28, 2011

(65) Prior Publication Data

US 2012/0117225 A1    May 10, 2012

Related U.S. Application Data

(63) Continuation-in-part of application No. 13/231,497, filed on Sep. 13, 2011, which is a continuation-in-part of application No. 13/053,650, filed on Mar. 22, 2011.

(60) Provisional application No. 61/407,531, filed on Oct. 28, 2010, provisional application No. 61/407,527, filed on Oct. 28, 2010.

(51) Int. Cl.
| | | |
|---|---|---|
| *G06F 15/173* | (2006.01) | |
| *H04L 12/24* | (2006.01) | |
| *H04L 12/26* | (2006.01) | |
| *H04N 17/00* | (2006.01) | |
| *H04N 21/44* | (2011.01) | |
| *H04N 21/442* | (2011.01) | |
| *H04L 29/06* | (2006.01) | |

(52) U.S. Cl.
CPC ........ *H04L 41/5025* (2013.01); *H04L 43/0894* (2013.01); *H04L 65/1083* (2013.01); *H04L 65/80* (2013.01); *H04N 17/004* (2013.01); *H04N 21/44004* (2013.01); *H04N 21/44209* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 6,847,395 B2 | 1/2005 | Thomas et al. | |
| 6,850,252 B1 | 2/2005 | Hoffberg | |

(Continued)

FOREIGN PATENT DOCUMENTS

| | | |
|---|---|---|
| CA | 2632885 | 6/2007 |
| CA | 2737476 | 6/2010 |

(Continued)

OTHER PUBLICATIONS

International Search Report and Written Opinion dated Feb. 5, 2013, International Application No. PCT/CA2012/001001.

(Continued)

*Primary Examiner* — Mohamed Ibrahim
(74) *Attorney, Agent, or Firm* — Bereskin & Parr LLP; Paul R. Horbal

(57) ABSTRACT

Systems, methods and apparatus are provided for computing quality scores for a media session delivered using an adaptive streaming protocol, where the quality score may be an estimate of a mean opinion score. The quality score reflects the impact of network delivery on a viewer's quality of experience (QoE). In particular, the quality score is generally based on the effects of stream switch events, as stream switches may be the result of impaired network delivery. Other network events, such as re-buffering events may also be incorporated in the score.

32 Claims, 25 Drawing Sheets

(56) References Cited

U.S. PATENT DOCUMENTS

| | | | |
|---|---|---|---|
| 7,398,543 | B2 | 7/2008 | Cotarmanac'h et al. |
| 7,533,075 | B1 | 5/2009 | Soferman et al. |
| 7,647,614 | B2 | 1/2010 | Krikorian et al. |
| 8,290,038 | B1 | 10/2012 | Wang et al. |
| 8,948,241 | B2* | 2/2015 | Chen et al. .................... 375/240 |
| 9,037,743 | B2 | 5/2015 | Kordasiewicz |
| 2001/0009548 | A1 | 7/2001 | Morris |
| 2003/0046384 | A1 | 3/2003 | Sirivara et al. |
| 2003/0135631 | A1 | 7/2003 | Li et al. |
| 2004/0034492 | A1 | 2/2004 | Conway |
| 2004/0068746 | A1 | 4/2004 | Mori et al. |
| 2005/0021830 | A1 | 1/2005 | Urzaiz et al. |
| 2005/0063377 | A1 | 3/2005 | Bryant et al. |
| 2005/0089043 | A1 | 4/2005 | Seckin et al. |
| 2005/0123053 | A1 | 6/2005 | Cooper et al. |
| 2005/0157660 | A1 | 7/2005 | Mandato et al. |
| 2005/0204052 | A1* | 9/2005 | Wang et al. .................... 709/231 |
| 2007/0169161 | A1* | 7/2007 | Kienzle et al. ................ 725/115 |
| 2007/0180106 | A1 | 8/2007 | Pirzada et al. |
| 2007/0220575 | A1 | 9/2007 | Cooper et al. |
| 2007/0245372 | A1 | 10/2007 | Yasuda |
| 2007/0261073 | A1 | 11/2007 | Blumenschein et al. |
| 2007/0271590 | A1 | 11/2007 | Gulas et al. |
| 2008/0002595 | A1 | 1/2008 | Rao |
| 2008/0155087 | A1 | 6/2008 | Blouin et al. |
| 2008/0159410 | A1 | 7/2008 | Perinkulam et al. |
| 2008/0195761 | A1 | 8/2008 | Jabri et al. |
| 2008/0205389 | A1 | 8/2008 | Fang et al. |
| 2008/0250448 | A1 | 10/2008 | Rowe et al. |
| 2009/0019178 | A1* | 1/2009 | Melnyk et al. ................ 709/233 |
| 2009/0034426 | A1* | 2/2009 | Luft et al. ..................... 370/252 |
| 2009/0043906 | A1* | 2/2009 | Hurst et al. ................... 709/231 |
| 2009/0210892 | A1 | 8/2009 | Ramaswamy |
| 2009/0234940 | A1 | 9/2009 | Pal et al. |
| 2010/0008241 | A1 | 1/2010 | Gustafsson et al. |
| 2010/0053300 | A1 | 3/2010 | Einarsson et al. |
| 2010/0128130 | A1 | 5/2010 | Howcroft |
| 2010/0189183 | A1* | 7/2010 | Gu et al. .................... 375/240.28 |
| 2010/0269044 | A1* | 10/2010 | Ivanyi et al. .................. 715/736 |
| 2011/0066703 | A1* | 3/2011 | Kaplan et al. ................. 709/219 |
| 2011/0194449 | A1 | 8/2011 | Connor |
| 2011/0228859 | A1 | 9/2011 | Sugimoto et al. |
| 2011/0265109 | A1 | 10/2011 | Goyet et al. |
| 2011/0296046 | A1 | 12/2011 | Arya et al. |
| 2012/0110167 | A1 | 5/2012 | Joch et al. |
| 2012/0117225 | A1 | 5/2012 | Kordasiewicz et al. |
| 2012/0259993 | A1 | 10/2012 | Eidelman et al. |
| 2013/0031575 | A1 | 1/2013 | Gallant et al. |
| 2013/0041988 | A1 | 2/2013 | Rodermund et al. |
| 2013/0086279 | A1 | 4/2013 | Archer et al. |
| 2013/0293725 | A1 | 11/2013 | Zhang et al. |
| 2013/0304934 | A1 | 11/2013 | Joch et al. |
| 2013/0318253 | A1 | 11/2013 | Kordasiewicz et al. |
| 2014/0181266 | A1 | 6/2014 | Joch et al. |
| 2015/0026309 | A1 | 1/2015 | Radcliffe et al. |

FOREIGN PATENT DOCUMENTS

| | | |
|---|---|---|
| EP | 1876757 A1 | 1/2008 |
| WO | 2012055023 A1 | 5/2012 |

OTHER PUBLICATIONS

Co-pending U.S. Appl. No. 13/231,497 entitled, "Device With Video Buffer Modeling and Methods for Use Therewith" filed Sep. 13, 2011.
Co-pending U.S. Appl. No. 13/053,650 entitled, "Delivery Quality of Experience (QoE) in a Computer Network" filed Mar. 22, 2011.
Brooks et al., "Delivering Quality of Experience: Why Being Objective and Quantitative id Important", IEEE Network, p. 8-13, Apr. 2010.
Batteram et al. "Delivering Quality of Experience in Multimedia Networks", Bell Labs Technical Journal, vol. 15, No. 1, p. 175-193, Jun. 2010.
Anonymous, "Video Streaming Quality Measurement with VSQI", Technical Paper, May 14, 2009, 14 pages.
U.S. Office Action dated Oct. 4, 2012, U.S. Appl. No. 13/053,650.
U.S. Office Action Response dated Jan. 4, 2013, U.S. Appl. No. 13/053,650.
Co-pending U.S. Appl. No. 13/480,964, "Methods and Apparatus for Providing a Presentation Quality Signal", filed May 25, 2012.
Document relating to U.S. Appl. No. 13/480,964, dated Nov. 18, 2013 (Office Action).
Document relating to U.S. Appl. No. 13/231,497, dated Nov. 18, 2013 (Office Action Response).
Winkler et al., "The Evolution of video Quality Measurement", from PSNR to Hybrid Metrics. Published in Broadcasting, IEEE Transaction on. vol. 54, Issue 3, pp. 660-668, Sep. 2008.
Takahashi et al., Standardization Activities in the ITU for a QoE Assessment of IPTV. Published in Communications Magazine, IEEE, vol. 46, Issue 2, pp. 78-84, Feb. 2008.
Yamagishi et al., Parametric Packet-Layer Model for monitoring Video Quality of IPTV Services, Published in Communications, 2008, ICC '08, IEEE International Conference, pp. 110-114, May 23, 2008.
Document relating to U.S. Appl. No. 13/053,650, dated May 17, 2013 (Office Action).
Document relating to U.S. Appl. No. 13/053,650, dated Jun. 18, 2013 (Applicant Summary of Interview with Examiner).
Document relating to U.S. Appl. No. 13/053,650, dated Jun. 26, 2013 (Applicant Initiated Interview Summary).
Document relating to U.S. Appl. No. 13/053,650, dated Jul. 2, 2013 (Office Action Response).
Document relating to U.S. Appl. No. 13/053,650, dated Sep. 10, 2013 (Advisory Action).
Document relating to U.S. Appl. No. 13/053,650, dated Oct. 4, 2013 (RCE).
Document relating to U.S. Appl. No. 13/053,650, dated Nov. 8, 2013 (Office Action).
Document relating to U.S. Appl. No. 13/231,497, dated Dec. 6, 2011 (Preliminary Amendment).
Document relating to U.S. Appl. No. 13/231,497, dated Mar. 29, 2013 (Office Action).
Document relating to U.S. Appl. No. 13/231,497, dated Jun. 12, 2013 (Office Action Response).
Document relating to U.S. Appl. No. 13/231,497, dated Oct. 10, 2013 (Office Action).
Co-pending U.S. Appl. No. 13/852,796, "Methods and Systems for Controlling Quality of a Media Session", filed Mar. 28, 2013.
Gustafsson et al. "Measuring Multimedia Quality in Mobile Networks with an Objective Parametric Model", ICIP 2008, 15th IEEE International Conference, Oct. 12, 2008, 4 pages.
Gustafsson et al. "P. NBAMS ToR; 379 (GEN/12)", International Telecommunication Union, Study Period 2009-2012, Sep. 17, 2010, 19 pages.
Hubbe et al., "An Innovation Tool for Measuring Video Streaming QoE", Techzine, Jan. 12, 2011, 7 pages.
Tan et al. "Perceived Video Streaming Quality under Initial Buffering and Rebuffering Degradations", MESAQIN Conference 2006, Jun. 5, 2006, 8 pages.
Menkovski et al., "Measuring Quality of Experience on a Commercial Mobile TV Platform"; IEEE; 2010 Second International Conferences on Advances in Multimedia; Jun. 13, 2013; pp. 33-38.
Yamagishi et al., "Non-instrusive Packet-Layer Model for Monitoring Video Quality of IPTV Services"; IEICE Transactions on Fundamentals of Electronics, Communications and Computer Sciences; Dec. 1, 2009; pp. 3297-3306' vol. E92A, No. 12; Engineering Sciences Society, Tokyo, JP.
Cuadra-Sanchez; End-to-End Quality of Service Monitoring in Convergent IPTV Platforms; IEEE; Third International Conferences on Advances in Multimedia Applications, Services and Technologies; Sep. 15, 2009; pp. 303-308.
Gustafsson et al., "Non-Intrusive bitstream model for the assessment of performance of video streaming"; Sep. 17, 2010.
Document relating to U.S. Appl. No. 13/053,650, dated Feb. 5, 2014 (Office Action Response).

(56) References Cited

OTHER PUBLICATIONS

Document relating to U.S. Appl. No. 13/053,650, dated May 23, 2014 (Office Action).
Document relating to U.S. Appl. No. 13/053,650, dated Aug. 21, 2014 (Response to Office Action and RCE).
Document relating to U.S. Appl. No. 13/231,497, dated Aug. 1, 2014 (Office Action).
Document relating to U.S. Appl. No. 13/231,497, dated Dec. 3, 2013 (Advisory Action).
Document relating to U.S. Appl. No. 13/231,497, dated Dec. 16, 2013 (RCE).
Document relating to U.S. Appl. No. 13/231,497, dated Dec. 13, 2013 (Response to Office Action).
Document relating to U.S. Appl. No. 13/231,497, dated Oct. 30, 2014 (Office Action Response).
Document relating to U.S. Appl. No. 13/231,497, dated Oct. 22, 2014 (Office Action).
Document relating to U.S. Appl. No. 13/480,964, dated Jun. 4, 2014 (Office Action).
Document relating to U.S. Appl. No. 13/480,964, dated Aug. 22, 2014 (Response to Office Action and RCE).
Document relating to U.S. Appl. No. 13/480,964, dated Feb. 13, 2014 (Office Action Response).
Document relating to U.S. Appl. No. 13/231,497, dated Feb. 11, 2015 (Office Action).
Document relating to U.S. Appl. No. 13/231,497, dated Mar. 27, 2015 (Response).
Document relating to U.S. Appl. No. 13/053,650, dated Mar. 17, 2015 (Response).
Document relating to U.S. Appl. No. 13/053,650, dated Mar. 19, 2015 (Applicant Initiated Interview Summary).
Document relating to U.S. Appl. No. 13/480,964, dated Jan. 29, 2015 (Notice of Allowance).
Document relating to U.S. Appl. No. 13/231,497, dated Apr. 16, 2015 (Advisory Action).
Document relating to U.S. Appl. No. 13/231,497, dated Jun. 9, 2015 (RCE).
Document relating to EP Application No. 12843281.2, dated Apr. 21, 2015 (Extended European Search Report).
"Performance monitoring points for IPTV; G. 1081 (Oct. 2008)", ITU-T Standard, International Telecommunication Union, Geneva; No. G.1081 (Oct. 2008), Oct. 22, 2008.
Menkovski, Vlado et al., "Measuring Quality of Experience on a Commercial Mobile TV Platform", IEEE Second International Conference on Advances in Multimedia (MMEDIA), 2010, Piscataway, NJ, USA, pp. 33-38, Jun. 13, 2010.
Document relating to U.S. Appl. No. 13/053,650, dated Jul. 16, 2015 (Notice of Allowance).

* cited by examiner

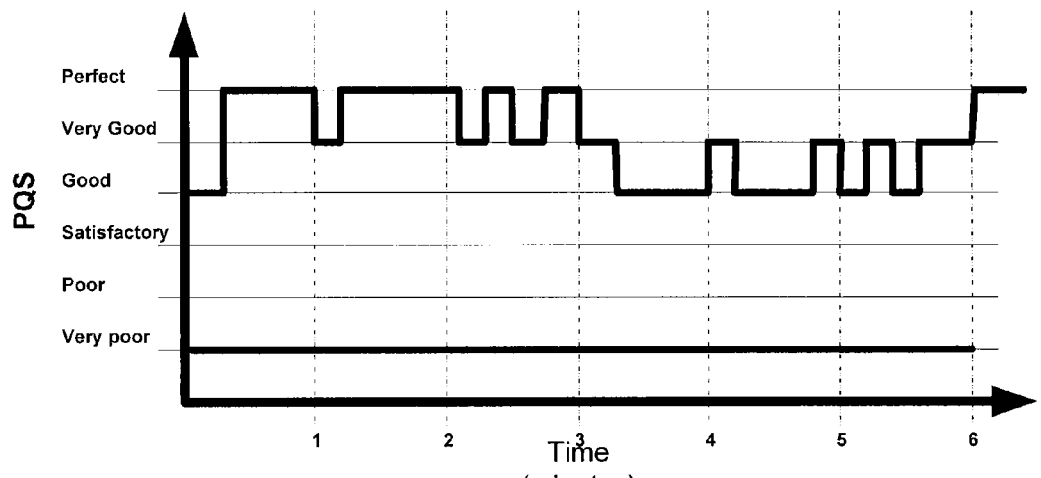
(a)
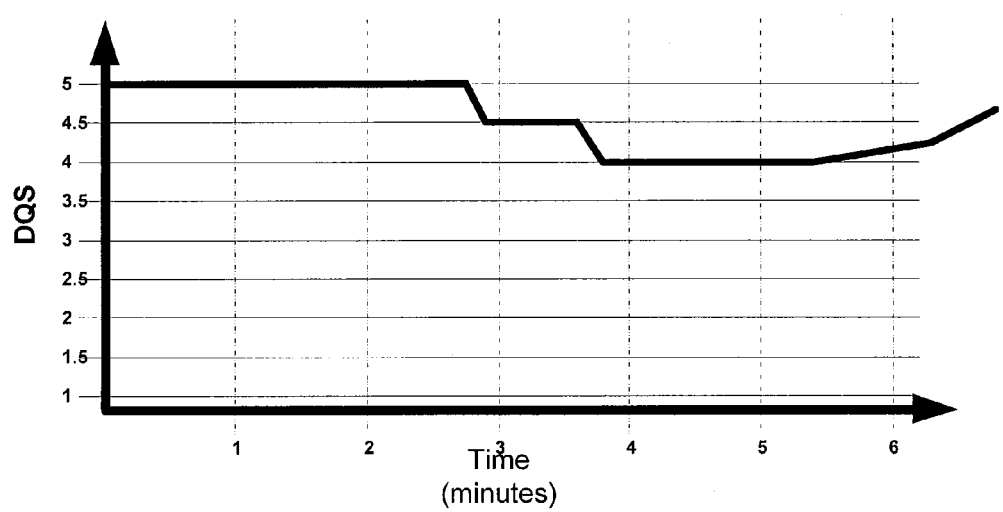
(b)
FIG. 19

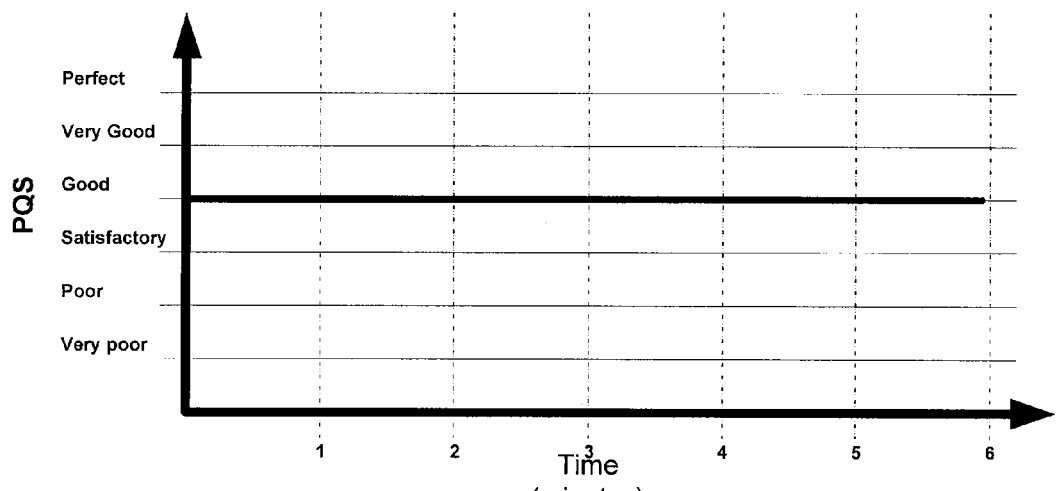
(a)
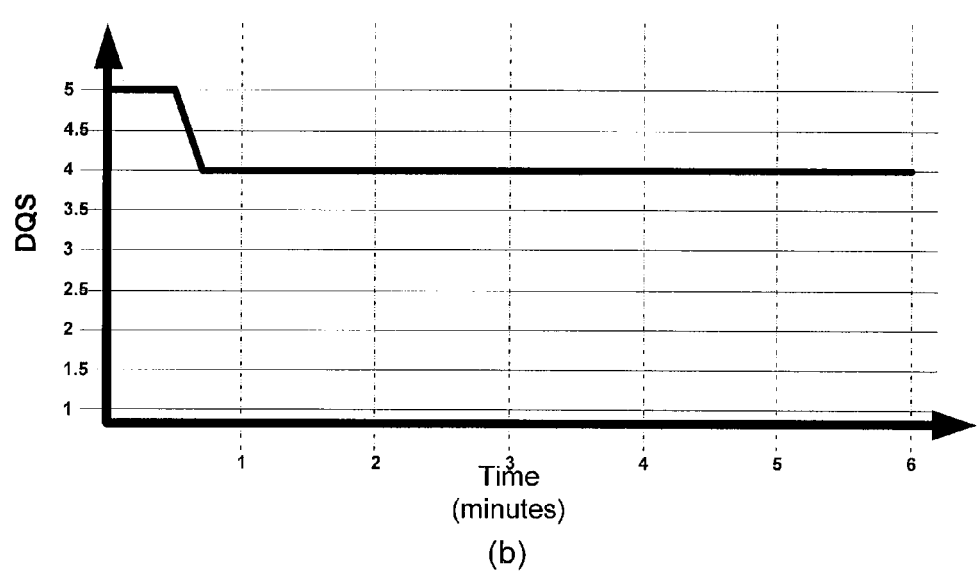
(b)
FIG. 21

METHODS AND APPARATUS FOR PROVIDING A MEDIA STREAM QUALITY SIGNAL

CROSS REFERENCE TO RELATED APPLICATIONS

This application is a continuation in part of U.S. patent application Ser. No. 13/231,497, entitled "DEVICE WITH VIDEO BUFFER MODELING AND METHODS FOR USE THEREWITH", filed on Sep. 13, 2011, which is a continuation in part of U.S. patent application Ser. No. 13/053,650, entitled "DEVICE WITH VIDEO BUFFER MODELING AND METHODS FOR USE THEREWITH", filed on Mar. 22, 2011, which claims the benefit of U.S. Provisional Patent Application No. 61/407,531, filed on Oct. 28, 2010. This application further claims the benefit of U.S. Provisional Patent Application No. 61/407,527, filed on Oct. 28, 2010. The entire contents of U.S. patent application Ser. No. 13/231,497, U.S. patent application Ser. No. 13/053,650, U.S. Provisional Patent Application No. 61/407,531 and U.S. Provisional Patent Application No. 61/407,527 are hereby incorporated by reference.

FIELD

The described embodiments relate to network monitoring and particularly in conjunction with video distribution in mobile networks and other networks.

BACKGROUND

Streaming media sent over various computer networks is becoming increasingly popular. Maintaining such streaming is becoming a problem for the organizations providing and maintaining such networks. Streaming media has become an important element of the "Internet" experience through the significant availability of content from sites like YouTube™, Netflix™ and many others. Streaming media content imposes a significant load for the organizations that provide the networks for such content to be delivered. The companies that provide the networks, and also the content producers and distributors are limited in their ability to gauge the satisfaction of the end user. This based in part, not only on the condition of the network, but the wide variety of different devices that can be used to access streaming media via a network.

SUMMARY

In a first aspect, there is provided a method of providing a quality signal for a media stream, the media stream transmitted in a media streaming session from a transmitting device to a receiving device via a network. The method may comprise: detecting a stream switch event in the media streaming session; and generating at least one key performance indicator based on the stream switch event.

The at least one key performance indicator may be selected from the group consisting of a number of stream switch events, a location in the media stream, a duration of the stream switch event, and a change in operating point for the stream switch event.

In some cases, the method may further comprise: updating a presentation quality signal based on the stream switch event; determining whether a quality change event has occurred based on at least one property of the presentation quality signal exceeding a predetermined threshold; and if a quality change event has occurred, updating an adjustment signal based on the presentation quality signal and the quality change event.

In some cases, media stream is an adaptive bitrate stream that defines a plurality of operating points, and the method further comprises determining that the stream switch event corresponds to a change from a first operating point to a second operating point in the plurality of operating points.

The plurality of operating points may be defined by an operating point characteristic selected from the group consisting of a video resolution, a video bit rate, a video frame rate, an audio sample rate, a number of audio channels, an audio bit rate, a receiving device type, a receiving device screen size, and combinations thereof.

In some cases, the method further comprises updating a delivery quality signal for the media streaming session based on the adjustment signal.

The predetermined threshold may be based on one or more parameters selected from the group consisting of: a duration of a change in the presentation quality signal; a magnitude of a change in the presentation quality signal; a rate of change in the presentation quality signal in a predetermined time window; and combinations thereof.

In some cases, the method further comprises: modeling a video player buffer of the receiving device based on the media streaming session; determining a receiving device playback state based on behavior of the modeled video player buffer; updating a user model state based on the receiving device playback state; and updating the adjustment signal based on the user model state.

The user model state may be determined based on one or more playback events selected from the group consisting of a frequency of re-buffering events, a duration of re-buffering events, an event location within the media stream, a duration of the media streaming session, a start-up delay for the media streaming session and a type of the media streaming session. The user model state may also be determined based at least on the stream switch event.

In some cases, the method further comprises: determining that the presentation quality signal has not changed in a predetermined period; determining whether the operating point corresponds to a best operating point for the media stream; and if the operating point does not correspond to the best operating point, update the adjustment signal.

Determining whether the quality change event has occurred may be further based on a configuration parameter associated with the media streaming session. The configuration parameter may be a receiving device configuration parameter or a transmitting device configuration parameter.

In some cases, the method may further comprise: detecting a re-buffering event in the media streaming session; and generating the at least one key performance indicator based on the re-buffering event.

The at least one key performance indicator may be selected from the group consisting of a number of re-buffering events, a location in the media stream, a duration of re-buffering events, and a start-up delay for the media streaming session.

In a second aspect, there is provided an apparatus for providing a quality signal for a media stream, the media stream transmitted in a media streaming session from a transmitting device to a receiving device via a network. The apparatus may comprise: a processor; a memory; a network interface configured to monitor the media streaming session between the transmitting device and the receiving device; and a quality change detection module configured to: detect a stream switch event in the media streaming session; and generate at least one key performance indicator based on the stream switch event.

The at least one key performance indicator may be selected from the group consisting of a number of stream switch events, a location in the media stream, a duration of the stream switch event, and a change in operating point for the stream switch event.

The quality change detection module may be further configured to: update a presentation quality signal based on the stream switch event; determine whether a quality change event has occurred based on at least one property of the presentation quality signal exceeding a predetermined threshold; and if a quality change event has occurred, update an adjustment signal based on the presentation quality signal and the quality change event.

The media stream may be an adaptive bitrate stream that defines a plurality of operating points, and the quality change detection module may be further configured to determine that the stream switch event corresponds to a change from a first operating point to a second operating point in the plurality of operating points.

The plurality of operating points may be defined by an operating point characteristic selected from the group consisting of a video resolution, a video bit rate, a video frame rate, an audio sample rate, a number of audio channels, an audio bit rate, a receiving device type, a receiving device screen size, and combinations thereof.

The apparatus may further comprise a signal generation module configured to update a delivery quality signal based on the adjustment signal.

The predetermined threshold may be based on one or more parameters selected from the group consisting of: a duration of a change in the presentation quality signal; a magnitude of a change in the presentation quality signal; a rate of change in the presentation quality signal in a predetermined time window; and combinations thereof.

The apparatus may further comprise: a buffer module, the buffer module configured to: model a video player buffer of the receiving device based on the media streaming session; determine a receiving device playback state based on behavior of the modeled video player buffer; update a user model state based on the receiving device playback state; and transmit an indication of the receiving device playback state to the quality change detection module, wherein the quality change detection module is further configured to update the adjustment signal based on the indication.

The user model state may be determined based on one or more playback events selected from the group consisting of a frequency of re-buffering events, a duration of re-buffering events, a re-buffering location within the media stream, a duration of the media streaming session, a start-up delay for the media streaming session and a type of the media streaming session. The user model state may also be determined based at least on the stream switch event.

The quality change detection module may be further configured to: determine that the presentation quality signal has not changed in a predetermined period; determine whether the operating point corresponds to a best operating point for the media stream; and if the operating point does not correspond to the best operating point, update the adjustment signal.

Determining whether the quality change event has occurred may be further based on a configuration parameter associated with the media streaming session. The configuration parameter may be a receiving device configuration parameter or a transmitting device configuration parameter.

The quality change detection module may be further configured to: detect a re-buffering event in the media streaming session; and generate the at least one key performance indicator based on the re-buffering event.

The at least one key performance indicator may be selected from the group consisting of a number of re-buffering events, a location in the media stream, a duration of re-buffering events, and a start-up delay for the media streaming session.

BRIEF DESCRIPTION OF THE DRAWINGS

Preferred embodiments will now be described in detail with reference to the drawings, in which:

FIG. 19 illustrates exemplary plots of two related quality signals with respect to time;

FIG. 21 illustrates exemplary plots of two further quality signals with respect to time;

DESCRIPTION OF EXEMPLARY EMBODIMENTS

Figure 1:
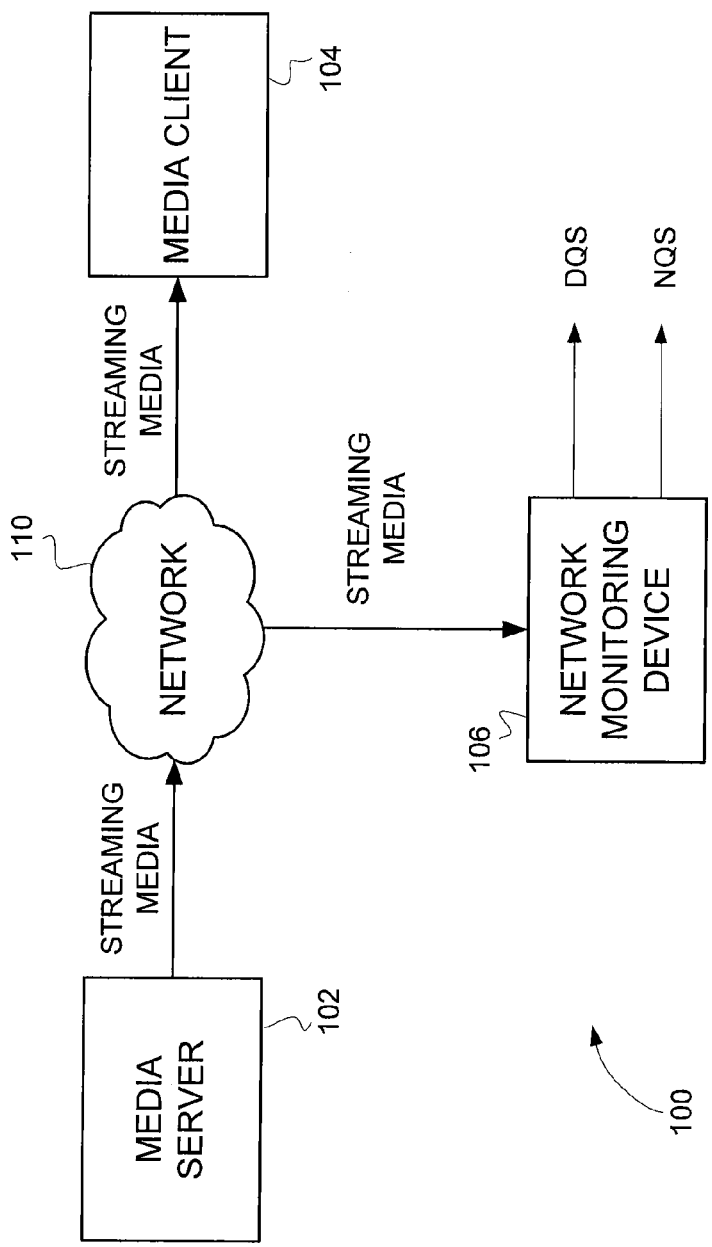
FIG. 1 is a block diagram illustrating an exemplary media streaming system.

Embodiments of the described systems, methods and apparatus may be used to estimate the impact of the delivery network on Quality of Experience (QoE) of media sessions for adaptive streaming protocols. Quality of Experience may be a subjective term used to describe how well a viewer is satisfied with a video presentation. A Quality of Experience score may be based on actual viewing of a media session.

Moreover, these systems, methods and apparatus may be used in conjunction with methods and apparatus to detect and report significant playback events (e.g. stalling/re-buffering) and statistics (e.g. average/maximum client buffer fullness, duration of video streamed or played).

In some embodiments, video streaming services may be provided over a reliable transport protocol such as Transmission Control Protocol (TCP). In order for such services to provide a good quality of experience in streaming video, the content should be delivered in real-time or faster. That is to say, the video data should be sent at the same rate (or faster) than required to sustain real-time playback. When the content is streamed faster than the playback rate, video data accumulates in the client's (i.e., receiving device's) buffer. This buffering helps prevent playback interruptions such as stalling and can compensate for changes in network throughput. With sufficient network throughput, a client receives the video data at a faster rate than playback. Therefore, brief outages or reductions in throughput can be tolerated without impacting QoE, as long as the buffer stays full. However during times of congestion or poor connectivity, the video buffer may become empty which will result in stalling and therefore poor QoE.

A media player initiates a video streaming session by sending a request for content to a server (i.e., transmitting device) and begins in an initial buffering state prior to starting playback. The server sends media data, filling the client's buffer with enough video data (frames) to provide some minimum amount of uninterrupted playback. Once enough data is accumulated, playback commences. During the playback, the client buffer is simultaneously being filled (data arriving via the network) and drained (data consumed via playback). Based on the difference between the fill and drain rates, the client buffer fullness increases or decreases over time.

Adaptive streaming protocols—also known as dynamic streaming or "adaptive bit rate (ABR) streaming"—refer to streaming technologies that dynamically adapt the delivered video quality by switching between streams of varying quality levels to maintain continuous playback while trying to maximize quality under changing network conditions. The varying quality levels may be based on audio or video operating point characteristics, such as, for example, bit rates, video resolution, video frame rate, video motion vectors, audio sampling rate, audio bit rate, number of audio channels etc. Examples of adaptive streaming technologies include Apple™ HTTP Live Streaming (HLS), HTTP Dynamic Streaming, Microsoft™ Silverlight™ Smooth Streaming, Netflix™ Streaming, and Adobe™ HTTP Dynamic Flash Streaming, and the like.

With adaptive streaming protocols, the occurrence of stalls is reduced by the ability of the client to switch to a lower quality level stream (e.g., an operating point with a lower bitrate) in the face of reduced bandwidth. To facilitate such switching, the streaming server may store multiple versions of the input content, representing a plurality of operating points. Each operating point may represent a different quality level, based on the bit rate, frame rate, pixel resolution, encoding quality and the like.

With such streaming protocols, small segments of the video can be requested and sent in independent network flows. The media client serializes the data that is received across multiple segments and flows. In some cases, data that overlaps in playback time may be sent (same content sent at two different quality levels), in which case, the media client filters out all but one version of the content, which is played.

With adaptive streaming protocols, the media client effectively tries to execute a real-time tradeoff between visual fidelity of media session content and network delivery quality. High quality media session content, such as media session content with higher encoding bit rate, generally produces a high visual fidelity. However, it also imposes greater requirements on the network throughput. Often, the high quality media session content tends to increase network impairments, and produces a lower delivery Quality of Experience (QoE) of the media session. On the other hand, streaming a low quality media session, such as, a media session with lower encoding bit rate, tends to reduce network impairments, and produces a higher delivery Quality of Experience (QoE) of the media session. With adaptive streaming protocols, the media client is effectively trying react to and improve a degraded network delivery quality by switching to a stream with a lower media session quality level.

In non-adaptive streaming technologies, such as HTTP Progressive Download (HTTP-PD), a delivery quality score may be used to measure the impact of the network delivery quality on the viewer experience. Such a quality score may be estimated relative to a perfect transmission of media session content without any network impairments such that it is independent of the quality of the media session content. In other words, in the case of non-adaptive streaming technologies, the delivery quality score explicitly ignores the media session source quality, for example the encoding quality of the media session content, and evaluates only the network delivery quality for the media session content.

The delivery quality score for non-adaptive streaming technologies may be calculated based on changes in the quality of the playback events during the viewing experience, such as re-buffering events. A model of viewer satisfaction may be used in the estimation. This model may map a set of video buffer state events to a score (DQS) based on a number of factors for a media session, where the mapping levels may be subjectively determined or assigned at least initially. The user model may be based on a memory model. Another model may map a set of hypothetical video buffer state events— which can be objectively determined—to another score (NQS) for a media session. The statistics on streamed and watched duration of video may be used to analyze viewing behavior.

Adaptive streaming can offer multiple versions of a video, at different operating points (e.g., with bit rates from 100 kbps to 2 Mbps). The video is delivered in separate, distinct segments (e.g., by breaking up the video into small files, or by using HTTP byte range requests). Finally, clients can seamlessly switch between operating points (e.g., based upon changing device or network conditions), in most cases simply by downloading the next video segments at the desired bit rate and quality level.

Accordingly, adaptive streaming may be considered an improvement over conventional HTTP-based progressive download and other non-ABR protocols. Adaptive streaming may be considered as a way to enhance or optimize visual fidelity in given real-time network delivery conditions or limitations. However, since an ABR client only sees its own bandwidth and is not aware of the other devices that compete for shared network resources, its stream switch decisions can be sub-optimal, often leading to unnecessary quality adjustments.

Often, these quality adjustments can be perceived by the viewer, and associated with degraded network throughput. Therefore delivery quality, as a QoE metric, is no longer affected solely by network re-buffering events (as with progressive downloads), but also by perceptible changes in the video quality.

In general, a higher bit rate produces a higher visual fidelity and therefore a higher perceived quality. However, the increased bit rate may impose a corresponding higher impact on network throughput. Often, the higher encoding bit rate tends to increase network impairments, and may result in a lower network delivery quality for the media session. Conversely, a lower bit rate, while it produces a lower perceived quality, tends to reduce network requirements and may result in a higher network delivery quality for the media session. In essence, a client may be considered to improve a degraded delivery quality by switching to a stream with a lower perceived quality.

The estimation algorithm that determines switching may be dependent on the specific client player. Generally, adaptive streaming players begin playback at a lower quality initial operating point (e.g., low bit rate). This allows for a low startup delay, and also lets the client player learn the currently available network throughput. If the client player estimates that the network throughput can sustain continuous playback at a higher bit rate (corresponding to a higher quality operating point), then the player can switch to the higher quality operating point. In some cases, additional factors such as processing power available at the client device may be factored into the switching decision.

In some cases, clients may be more aggressive in selecting a "best" operating point first and reduce operating point as needed. Other clients may not attempt to switch operating points at all.

Adaptive streaming has several associated factors that may need to be considered. For example, adaptive streaming playback may be more computationally complex for the client player. A number of operating points may need to be encoded and stored on the server. Adaptive streaming protocols may conflict with other protocol layers, such as TCP. Finally, adaptive streaming may tend to be reactive in nature, because clients may only become aware of network congestion after the fact. This may result in a high degree of visual quality variation during a media streaming session.

Referring to FIG. 1, a block diagram of an exemplary system 100 is shown. The system 100 illustrates an example of a high level overview of an implementation of an embodiment. The system 100 generally comprises a media server block (or circuit) 102, a media client block (or circuit) 104 and a network monitoring device block (or circuit) 106. The media server 102 may present media content (e.g., a signal STREAMING_MEDIA) through a network 110. The network 110 may be implemented as a delivery network comprising numerous complex and/or interconnected hardware and/or software systems through which streaming media travels. The signal STREAMING_MEDIA may be presented to both the media client 104 and the network monitoring device 106. QoE estimation may be implemented in the network monitoring device 106 as media sessions (e.g., STREAMING_MEDIA) moving through the network 110 are monitored. The monitoring device 106 may be implemented in hardware, software or a combination of hardware and/or software. In one example, the monitoring device 106 may monitor traffic in Internet Protocol (IP) networks. However, the particular type of network may be varied to meet the design criteria of a particular implementation. While the monitoring device 106 is shown connected to the network 110, the monitoring device 106 may also be connected directly at the media server 102 or the media client 104. In some cases, monitoring device 106 may be positioned in the path of network traffic. That is, monitoring device 106 may be incorporated into a network router or deep packet inspection device that is "inline" or a "bump in a wire".

The monitoring device 106 may inspect all packets on network interfaces (e.g., the media client 104) being monitored. The monitoring device 106 may look for media sessions on the network 110. Once a media session is detected, the state of the media client 104 may be generally estimated for the purpose of QoE estimation. The state information can be based on how and when a particular session is started and how the media is delivered over the network 110. The state information may then be used to either compute an estimate of a delivery quality score (DQS), which may be mapped to a set of levels that are subjectively determined, or a network quality score (NQS), which may be based on a set of objective factors. The state information and intermediate signals may also be analyzed and reported directly to generate a report of key performance indicators (KPIs) for video streaming on the network. Examples of statistics that may be reported include the number, frequency and duration of re-buffering events, buffer fullness measures (such as average, minimum and maximum values over various intervals), and durations of video downloaded/streamed and played/watched. Key performance indicators may also include a number of stream switch events, a location in the media stream, a duration of the stream switch event, and a change in operating point for the stream switch event.

Figure 2:
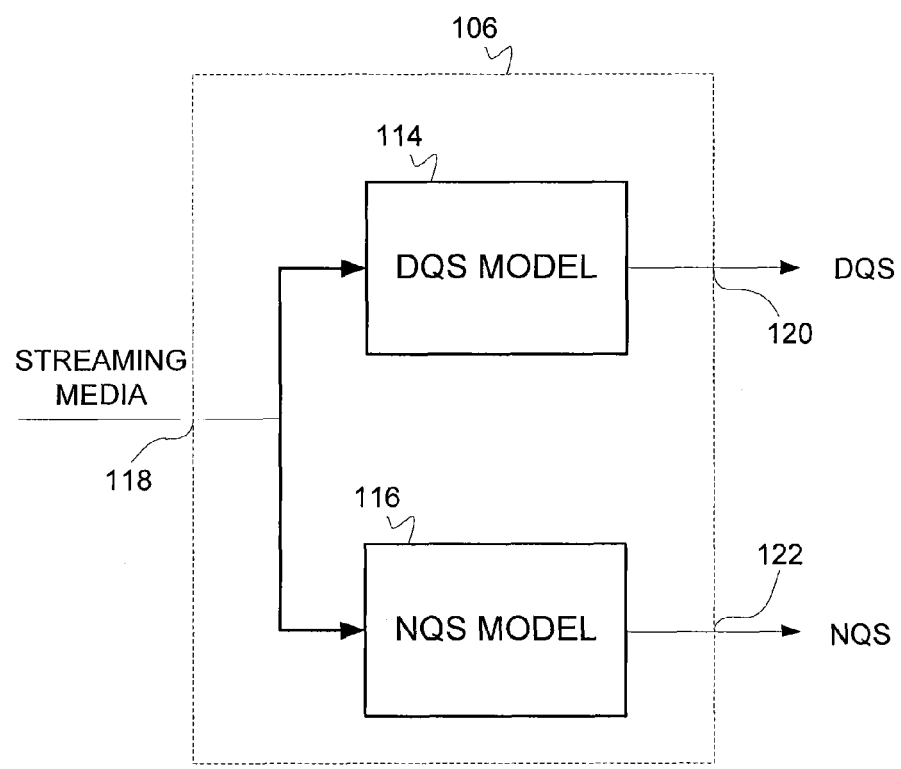
FIG. 2 is a simplified block diagram of an exemplary monitoring device.

Referring to FIG. 2, a simplified block diagram of the device 106 is shown. The device 106 generally comprises a DQS block (or circuit) 114, and a NQS block (or circuit) 116. The device 106 may have an input 118 that may receive the signal STREAMING_MEDIA, an output 120 that may present the signal DQS and an output 122 that may present the signal NQS. The signal DQS may be in a first format (e.g., a MOS range of 1 to 5), while the signal NQS may be in a second format (e.g., a percentage). The device 106 may generate the signal DQS and the signal NQS based on, or in response to, the signal STREAMING_MEDIA. The monitoring device may generate the signal DQS individually, the signal NQS individually, or a combination of the signal DQS and the signal NQS. The signal DQS and/or the signal NQS may be considered as signals expressing the impact of the delivery network on the end user quality of experience (e.g., quality of experience signal).

Figure 3:
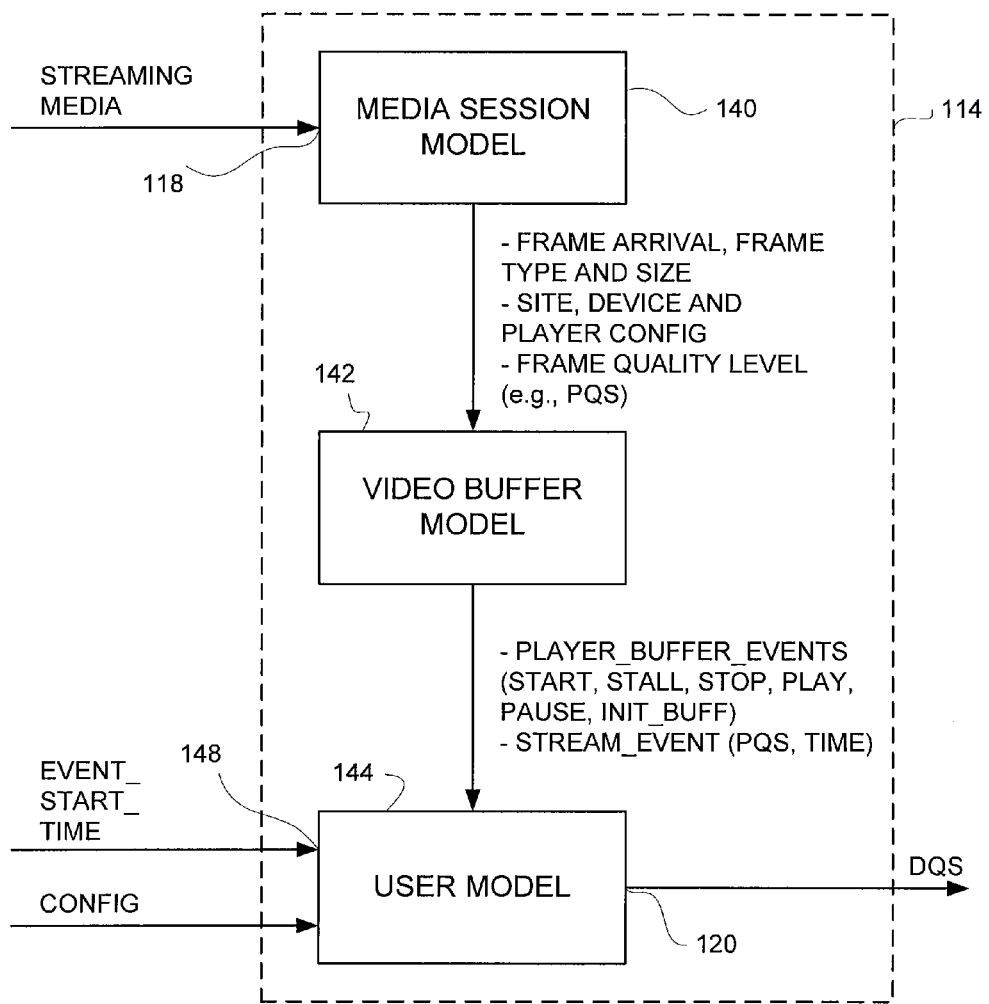
FIG. 3 is a diagram illustrating an exemplary data path of the generation of a DQS signal.

Referring to FIG. 3, a more detailed description of the DQS block 114 generating a DQS data flow is shown. In one example, the DQS block 114 is presented for the reliable transport (TCP) use case. The DQS block 114 generally comprises a media session model block (or circuit) 140, a video buffer model block (or circuit) 142 and a user model block (or circuit) 144. Blocks 140, 142, and 144 may be implemented as hardware, software, or a combination of hardware and/or software. The DQS block 114 may have an input 118 that may receive the signal STREAMING_MEDIA and an output 120 that may present the signal DQS. The user model block 144 may have an input 146 that may receive a signal (e.g., PLAYER_BUFFER_EVENTS), an input 148 that may receive a signal (e.g., EVENT_START_TIME) and an output 120 that may present the signal DQS.

The media session model block 140 may (i) assemble the network traffic (e.g., packets), (ii) track frame arrivals at the media client 104, (iii) detect site, device, player information and/or the start and end of media sessions and/or (iv) detect audio and/or video frames, including frame type and/or frame size.

The video buffer model block 142 may use all or part of the information from the media session model block 140 to estimate the state of the media client 104. The estimation may be presented as an event indicator in the signal PLAYER_BUFFER_EVENTS provided to input 146. The events may include, but are not limited to, an INITIATE event, a STALL event, a STOP event, a PLAY event, a PAUSE event and a SEEK event. The state (event) information may then be used by the user model block 144 to compute a value for the signal DQS. In embodiments supporting adaptive bitrate streaming, user model block 144 may also receive signals comprising stream switch events associated with a quality level change for an adaptive streaming session, as described further herein. The signal DQS may be a unique signal that may be computed for each media session. The value of the signal DQS may be computed and updated throughout the media session. A value of the signal DQS may then be stored to an external system (e.g., a memory or other storage device—not shown).

The user model block 144 may compute a delivery quality score that may be an estimate of a viewer experience of streaming media as affected by perceivable transmission impairments. The signal DQS may be an estimate of a score based on input from the video buffer model block 142. Accordingly, the delivery quality score may be impacted by an estimate of an actual video buffer within the media client device 104.

In some embodiments, it may be desirable to have a network quality score based on objective factors in addition to a delivery quality score, which can be mapped to levels that are subjectively determined. The NQS model block 116 may compute a signal NQS (described in more detail in FIG. 6).

Figure 4:
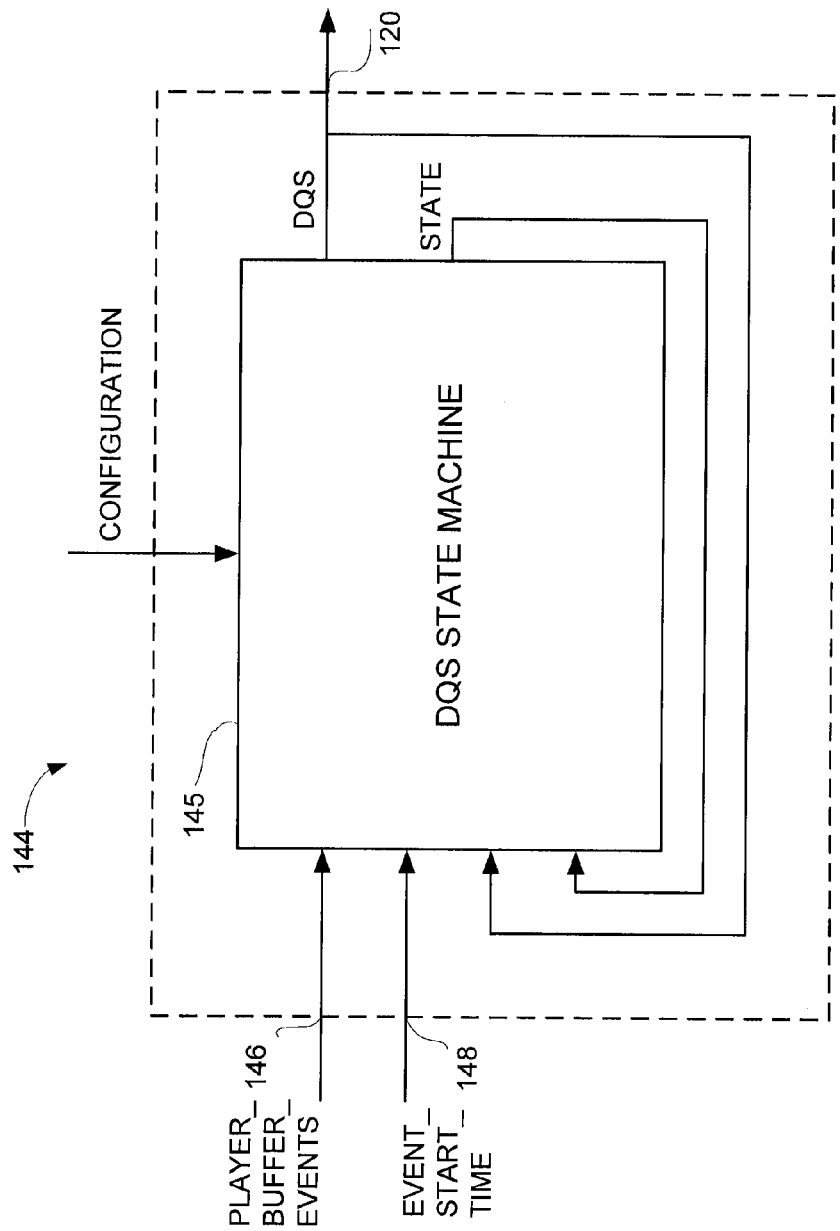
FIG. 4 is a diagram of an exemplary user model block.

Referring to FIG. 4, a diagram of an exemplary user model block 144 is shown. The user model block 144 may include a state machine 145. The state machine 145 may generate the signal DQS in response to the signal PLAYER_BUFFER_EVENTS, and the signal EVENT_START_TIME. In some alternative embodiments, the state machine 145 may generate an intermediate signal used to generate the signal DQS (e.g., by another block). The state machine 145 may generate a signal STATE that may also be used as a feedback input to the state machine 145. The signal STATE may indicate a current state of the state machine 145. The signal DQS may also be presented as a feedback to the state machine 145. That is, the state machine 145 may adjust the current value in the signal DQS based on the previous value feedback in the signal DQS.

Figure 5:
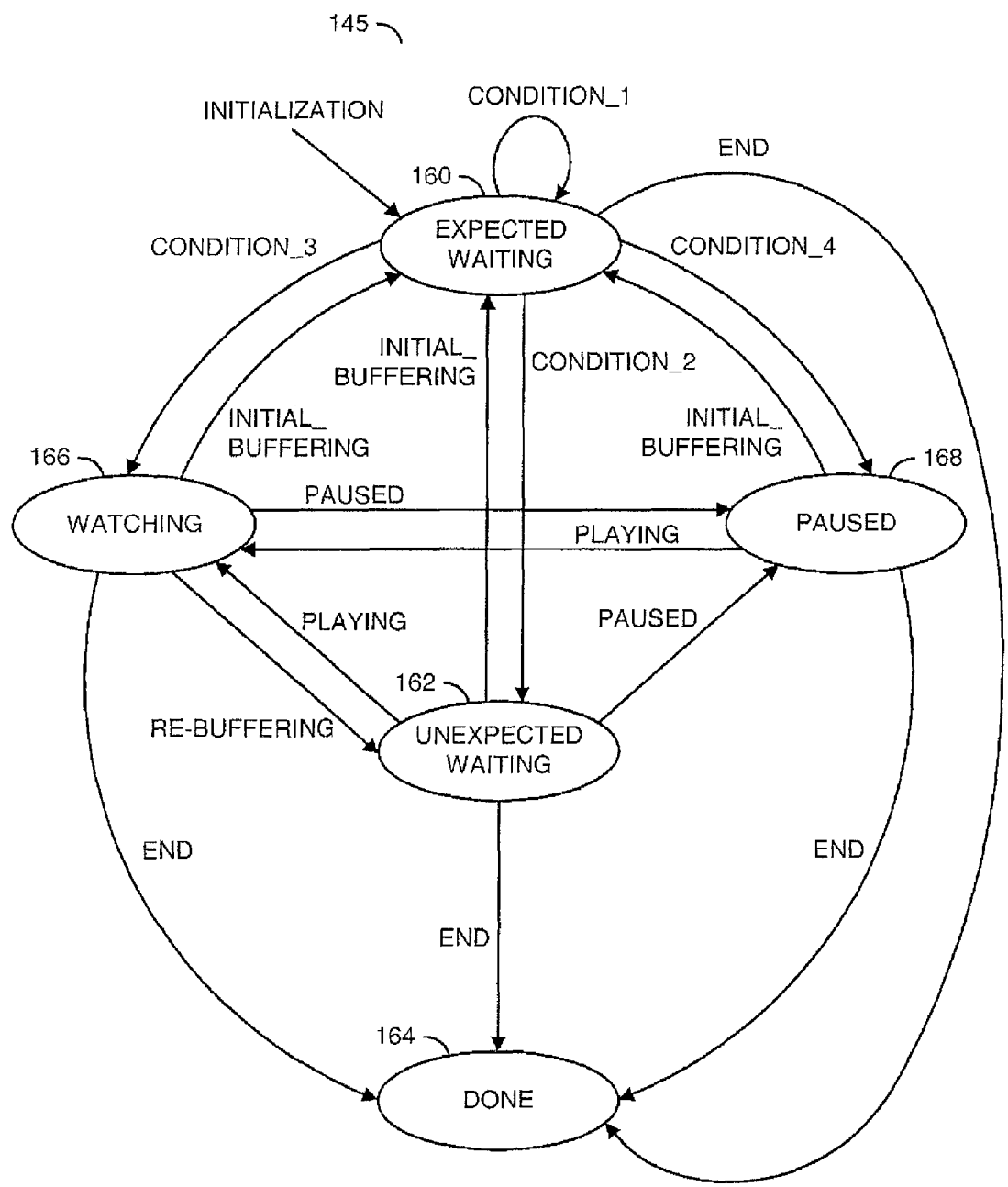
FIG. 5 is a diagram of an exemplary state machine implementation of the user model.

Referring to FIG. 5, a state diagram of the state machine 145 is shown. The state machine 145 generally comprises a state (or step) 160, a state (or step) 162, a state (or step) 164, a state (or step) 166 and a state (or step) 168. The state 160 may be used as an expected waiting for playback state. The state 162 may be an unexpected waiting state. The state 164 may be a complete (or done) state. The state 166 may be a watching state. The state 168 may be a paused state. The states 160 to 168 may be implemented as hardware, software, or a combination of hardware and/or software. The state machine 145 may update periodically (e.g., once per second) or may be updated based on events. At each of the updates, the state machine 145 may or may not change states depending upon the current state and the information received in the signals PLAYER_BUFFER_EVENTS and EVENT_START_TIME. The state machine 145 may also update a satisfaction value (or level) in the signal DQS at each update.

The state machine 145 may initialize to the state 160 upon assertion of the signal EVENT_START_TIME. The assertion of the signal EVENT_START_TIME generally indicates that streaming of a media program has begun. The user normally expects that an initial delay (e.g., X seconds or less) may be experienced between the beginning of the stream and the appearance of the video and/or audio from the media client device 104.

While the state machine 145 is in the state 160, an initial buffering of the video and/or audio as received from the network 110 generally takes place in the media client device 104. The buffering may also be modeled by the video buffer model block 142. Since the viewer expects the initial buffering delay, viewer satisfaction may remain unaltered by the state machine 145. Accordingly, the satisfaction value represented in the signal DQS may remain unaltered at a current value. A high satisfaction value (e.g., a DQS score of 5) generally means that the quality of the delivery is permitting a satisfactory experience for the viewer. A low satisfaction value (e.g., a DQS score of 1) may indicate that the quality of the delivery is causing an unsatisfactory experience for the viewer.

A condition (e.g., CONDITION_1) may occur if the state machine 145 cycles while in the state 160, the initial buffering is still in progress, and less than the full initial buffering delay has elapsed since the signal EVENT_START_TIME was asserted. The CONDITION_1 generally leaves the state machine 145 in the state 160 to continue the initial buffering. The state machine 145 may leave the signal DQS unchanged by the CONDITION_1.

A condition (e.g., CONDITION_2) may occur if the state machine cycles while in the state 160, the initial buffering is still in progress, and the viewer has waited for the entire initial buffering delay (e.g., waited more than X seconds). Occurrence of the CONDITION_2 generally causes the state machine 145 to transition from the state 160 to the state 162. In the state 162, the buffering may continue. The continuing delay may be perceived by the viewer as an unexpected delay. Therefore, the state machine 145 may reduce the signal DQS (representative of the reduction in viewer satisfaction level) over time while in the state 162. Changing the signal DQS is generally described in more detail below.

When in state 160, a condition (e.g., CONDITION_3) may occur if the initial buffering has finished within the initial delay time (e.g., ≤X seconds) and the signal PLAYER_BUFFER_EVENTS indicates that the media program has started playing (e.g., the Initiate event and/or the PLAY event). The CONDITION_3 generally causes the state machine 145 to transition from the state 160 to the state 166.

The state 166 may indicate that the viewer is experiencing (e.g., watching) the media program. Therefore, the state machine 145 may maintain or increase the satisfaction value in the signal DQS.

When in state 160, a condition (e.g., CONDITION_4) may occur if the initial buffering has finished within the initial delay time and the signal PLAYER_BUFFER_EVENTS indicates that the media program has been paused (e.g., the PAUSE event) by the viewer. The CONDITION_4 generally causes the state machine 145 to transition from the state 160 to the state 168. The state 168 generally means that the media program is currently paused. Since the viewer initiated the pause, the state machine 145 may hold the satisfaction value unchanged as long as the state machine 145 is in the state 168.

While in the state 168, the viewer may resume playback of the media program. The resumption may be indicated in the signal PLAYER_BUFFER_EVENTS (e.g., the Initiate event and/or the PLAY event) by the video buffer model 142. The state machine 145 may respond to the resumed playback condition (e.g., PLAYING) by transitioning from the state 168 to the state 166.

While in the state 166, the video buffer model 142 may indicate that all of the content of the media program previously received from the network 110 has been read from the buffer (e.g., a stall in the playback). The video buffer model 142 may indicate the stall to the state machine 145 in the signal PLAYER_BUFFER_EVENTS (e.g., the STALL event). The state machine 145 generally treats the stall event as a condition (e.g., RE-BUFFERING). From the state 166, the state machine 145 may transition to the state 162 in response to the condition RE-BUFFERING. The viewer may perceive the stall in the playback as an unexpected delay. Therefore, the state machine 145 may decrease the satisfaction value in the signal DQS while in the state 162.

Once the video buffer model 142 indicates that a sufficient amount of content has been received from the network 110 to resume the playback, the video buffer model 142 generally informs the state machine 145 via the signal PLAYER_BUFFER_EVENTS (e.g., the Initiate event). From the state 162, the state machine 145 may consider the reception of the Initiate event as the condition PLAYING. As such, the state machine 145 may transition from the state 162 to the state 166 at the next state machine cycle.

If the viewer pauses the playback while the state machine 145 is in either the state 166 or the state 162, the condition PAUSE may exist. At the next state machine cycle, the state machine 145 may transition from the state 162 or 166 to the state 168. If sufficient content is buffered when the media program resumes playback, the state machine 145 may transition from the state 168 to the state 166. If insufficient content is buffered when the media program resumes playback, the resulting delay may be perceived by the viewer as a normal buffering delay. Therefore, the state machine 145 may transition from the state 168 to the state 160.

If the viewer temporally jumps forward or backward in the playback of the media program, the video buffer model 142 may indicate the jump in the signal PLAYER_BUFFER_EVENTS (e.g., the INITIAL_BUFFERING event). If the seek is sufficiently forward or backwards in time, the content being sought may not be currently buffered. A delay may result while the requested content at the seek point is obtained from the media server 102. The seek delay may be perceived by the viewer as a normal delay. When the event INITIAL_BUFFERING is asserted, the state machine 145 may transition from any of the states 162, 166 and 168 back to the state 160 when cycled.

If the media program reaches an end, or the viewer intentionally stops the playback, the video buffer model 142 may inform the state machine 145 in the signal PLAYER_BUFFER_EVENTS (e.g., the STOP event). The state machine 145 may view the STOP event as the assertion of a condition (e.g., END). When the condition END is asserted, the state machine 145 may transition from any of the states 160, 162, 166 and 168 to the state 164. While in the state 164, the state machine 145 may hold the DQS value unchanged.

Figure 6:
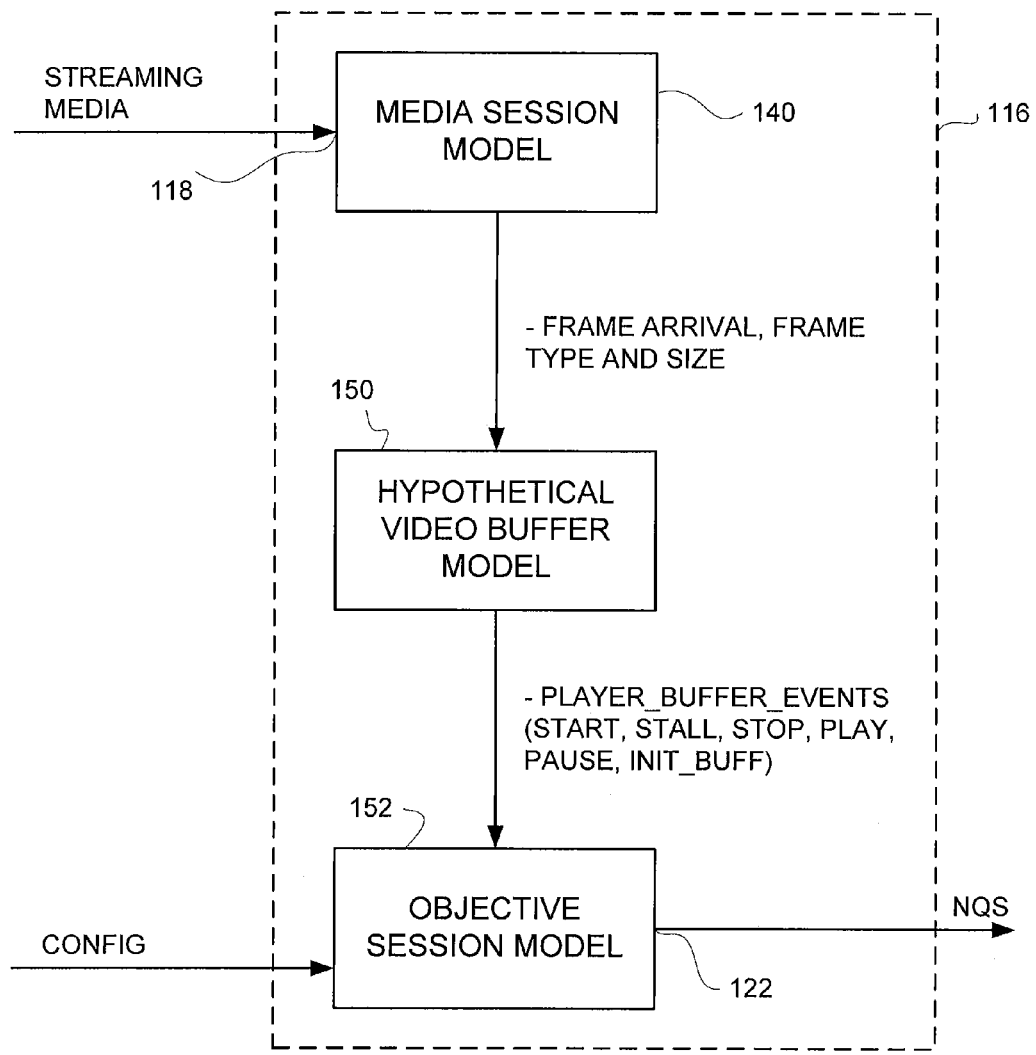
FIG. 6 is a diagram illustrating an exemplary data path of the generation of a NQS signal.

Referring to FIG. 6, a more detailed description of the NQS model block 116 generating a data flow for generating the signal NQS is shown. The NQS model block 116 generally comprises the media session model block 140, a hypothetical video buffer model block (or circuit) 150 and a NQS session model block (or circuit) 152. The block 116 may have an input 118 that may receive the signal STREAMING_MEDIA and an output 122 that may present the signal NQS. The block 152 may have an input 154 that may receive the signal PLAYER_BUFFER_EVENTS and an output 122 that may present the signal NQS.

The generation of the signal NQS normally depends on many of the same inputs as the generation of the signal DQS, which may be computed by the media session model block 140. The main difference between generating the signal DQS and the signal NQS can lie in the implementation of the video buffer model block 142 and the score calculation. In particular, the generation of the signal NQS may employ a hypothetical video buffer model block 150, which no longer models a specific site, device, or player, but assumes a generalized greedy client. A greedy client may be defined as a client that displays a frame as soon as such a frame is delivered over the network 106. The state of the client 104 (as estimated by the hypothetical buffer model 150) may then be used by an NQS session model which may compute a score (e.g., from 0 to 100) that can be output as the signal NQS. A unique signal NQS may be calculated for each media session that is monitored. The value of the signal NQS may be sampled throughout the session and may be stored to an external system.

The hypothetical video buffer model block 150 may be similar to the video buffer model block 142 described in connection with FIG. 2. The model block 150 may estimate the state of a generalized greedy client for a given media session. This imposes a tighter real-time delivery bound which may expose any deficiencies in the ability of the network 110 to deliver the media session in real time. To do this, various parameters in the video buffer model 150 may be set to the most aggressive values. In particular, a simulated video buffer in the hypothetical video buffer model block 150 may be filled at the network rate and emptied at the play rate. However, once the simulated video buffer is drained, the first frame to be removed is generally removed as soon as it arrives. The hypothetical video buffer model 150 is normally a greedy buffer model. A greedy buffer model 150 may be consistent for all media sessions and may allow the calculation of a normalized score and a more objective score.

The network monitoring device 106 may be implemented as a hardware and/or software system. The device 106 may implement media session modeling. The relevant models and/or interactions have been highlighted in the previous section. In this section, various models used to compute delivery QoE are described in further detail. The various models include (i) a video buffer model, (ii) a hypothetical video buffer model, (iii) a user model, and/or (iv) an objective session model.

Figure 7:
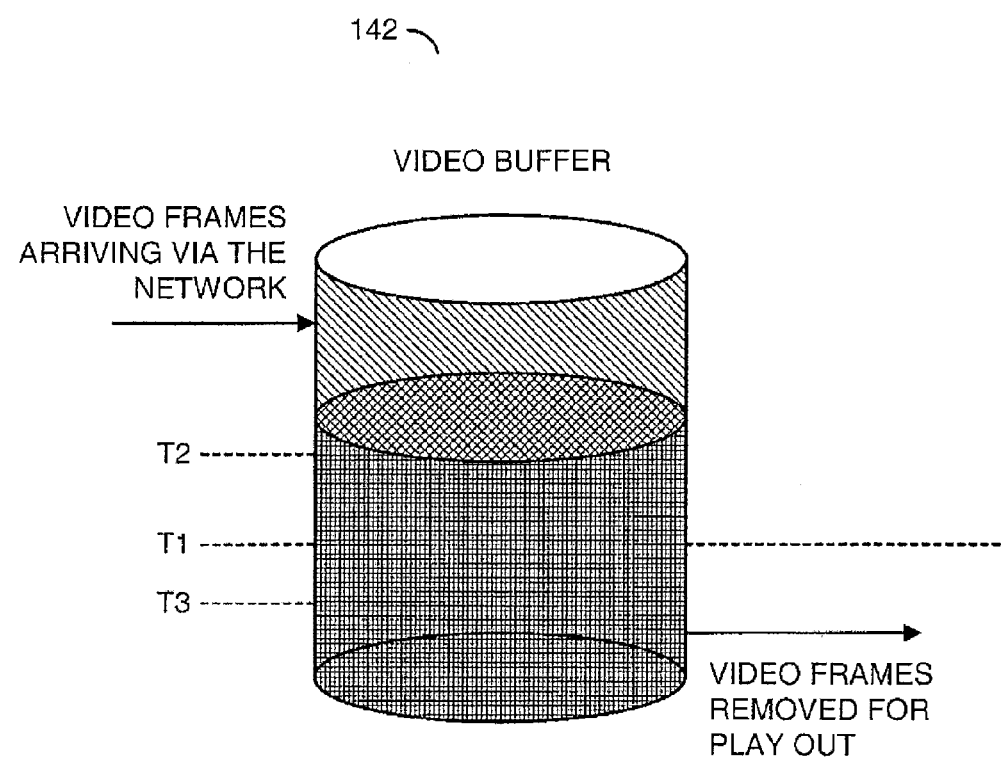
FIG. 7 is a diagram illustrating an exemplary video buffer model.

Referring to FIG. 7, an illustration of the video buffer model 142 is shown. The video buffer model 142 may be implemented having a threshold T1, a threshold T2 and a threshold T3. The video buffer model 142 may estimate the state of the client 104 video buffer for a given media session. The video buffer model 142 may be implemented as a video frame queue where frames are inserted at the rate at which they arrive at the client device 104 over the network 110. The frames may be removed in a decode order at a video play rate (e.g., 24 frames per second, etc.). There are typically several unique and/or possibly dynamically changing thresholds that may be web site, device and/or player dependent. In one example, a threshold may be the amount of playback time represented by the frames in the buffer T1 that is needed in the video buffer 142 before the first video frame is removed and played at the beginning of the media session. In another example, the threshold may be the amount of playback time represented by the frames in the buffer T2 that is needed in the video buffer 142 before the first video frame is removed and played after the video buffer 142 has run empty causing the playback to stall. In another example, the buffer T3 may reach a threshold that may represent a certain minimum amount of playback time represented by the frames in the video buffer 142 that need to be maintained, where falling below this threshold may cause the media player 104 to stall.

For media sessions that are transmitted over a reliable network layer such as TCP, the only perceivable impairments due to the network may be re-buffering events and/or quality changes. This is due to the fact that all video frames are guaranteed to arrive for active connections. However, the arrival time may be significantly delayed (e.g., due to retransmissions) and may cause the media client 104 to drain the video buffer in block 142 and may cause a re-buffering event. These re-buffering events can be estimated by the video buffer model block 142.

For media sessions that are transmitted over an unreliable network layer (e.g., UDP) the perceivable impairments due to the network 110 are more numerous. For example, some frames or portions of frames may not arrive at the media client 104. The types of perceivable impairments may include break-up, re-buffering, skipping and/or out of sync audio/video transmissions. A break-up may occur if a decoder in the media client 104 does not receive a frame or part of a frame, and the media client 104 may thus begin using incorrect reference data producing artifacts. The stream may later correct itself with the arrival of a key frame (e.g., IDR frame). A re-buffering event may occur if the media client 104 attempts to buffer additional video before resuming playback (e.g., if the decoder is starved of additional frames to process). This is particularly useful if transmission is slower than real time due to jitter and/or congestion. Skipping may occur when a viewer directs the client player to jump to particular playback location within the media stream, and thus causes unanticipated video and/or audio jumps. Out of sync events may occur when video and/or audio get out of sync. Combinations of the perceivable impairments listed above may also occur.

In one example, the user model block 144 for media sessions transmitted over a TCP network may be considered. The user model block 144 normally receives the state of the video buffer model block 142 as an input, and generates a score in a MOS scale.

Figure 8:
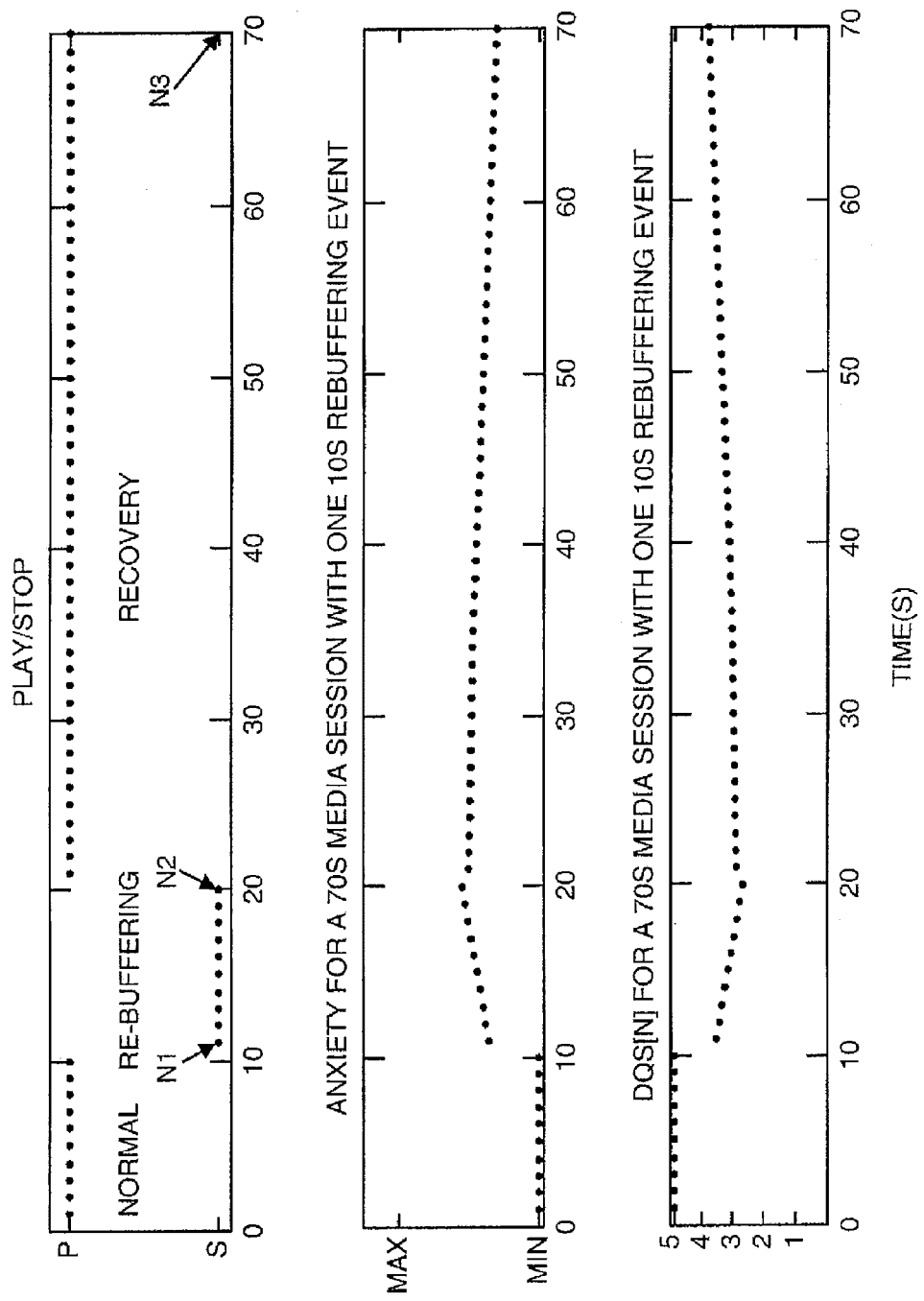
FIG. 8 is a diagram illustrating a number of graphs implementing an exemplary user model.

In FIG. 8, a 70 second long media session is partitioned into three regions (top graph of FIG. 8). The "P" and "S" on the y-axis normally represent the state of the video buffer model, either playing or stopped (re-buffering). For each of these regions there is a corresponding level of dissatisfaction (middle graph of FIG. 8). In the "Normal" region, dissatisfaction is at its lowest, since everything is working normally. In the "Re-buffering" region, a re-buffering event occurs which has the immediate impact of an abrupt increase in dissatisfaction and as the event continues the dissatisfaction continues to build. In the "Recovery" region, as playback resumes there is an abrupt decrease in dissatisfaction and the dissatisfaction continues to decrease as playback resumed. Note that in the recovery region while playback continues dissatisfaction continues to decrease, there is still the memory of the re-buffering event due to recency effects. The recovery section may be further divided into the initial, continued, and long lasting effects to be within range. In one example, the signal DQS may be computed by scaling the viewer dissatisfaction function to be within the range of 0 to 4, then subtracting the scaled result from 5. The signal DQS plotted over time for this example is shown in the bottom graph of FIG. 8.

The relationships shown in FIG. 8 can be expressed by the following equation:

$$Q[n] = \begin{cases} Q_1[n], & n < n_1; \\ Q_2[n], & n_1 \le n < n_2; \\ Q_3[n], & n_3 \le n < n_3; \end{cases} \quad \text{EQ1}$$

where n1, n2 and n3 are times of the re-buffering start, re-buffering end, and video duration respectively, and function $Q[n]$ is the signal DQS. $Q_1[n]$, $Q_2[n]$ and $Q_3[n]$ are the unique functions for each or the intervals, and may be further expressed by the following equation:

$$Q[n] = \begin{cases} 5, & 0 \le n \le n_1; \\ [Q[n_1-1]-(n-n_1)\cdot F_1[n]-F_2[n_1-1]], & n_1 \le n \le n_2; \\ [Q[n_2-1]+(n-n_2)\cdot F_3[n]+F_4[n_2-1]], & n_2 \le n \le n_3; \end{cases} \quad \text{EQ2}$$

where $F_2[n]$ represents initial decrease in satisfaction, $F_1[n]$ represents continued and growing dissatisfaction, $F_4[n]$ represents initial increase in satisfaction and $F_3[n]$ represents a continued and growing satisfaction. The function $Q[n]$ is clamped to be within the desired range of 1 to 5.

On average a viewer does not experience the same initial dissatisfaction for all re-buffering events. Similarly, dissatisfaction does not build the same way for the all re-buffering events. The same applies to the recovery. Before defining $F_1[n]$, $F_2[n]$, $F_3[n]$, $F_4[n]$, it is important to define vector $n=(n1, n2, n3, n4 \ldots ni, ni+1, ni+2)$. This vector is a list of times for which the video stops and starts (odd indexes indicate a re-buffering event start and even indexes indicate re-buffering event end). With the vector n defined, $F_2[n]$ may be described by the following equation:

$$F_2[n] = \begin{cases} f_{2,1}, & \text{first re-buffering event, } n = n_1; \\ f_{2,3}, & \text{second re-buffering event, } n = n_3; \\ \vdots & \vdots \\ f_{2,i}, & k'\text{th re-buffering event, } n = n_i; \end{cases} \quad \text{EQ3}$$

where $f_{2,1}$, $f_{2,3}$ and $f_{2,i}$ are constants. Using a different constant for each event may be most accurate. However, through experimentation the biggest difference in initial dissatisfaction may be found to occur between the first and subsequent events. The initial dissatisfaction following the first re-buffering event is approximately constant. However, subsequent initial dissatisfaction increases are relative to dissatisfaction level just before the event. Therefore under most circumstances, dissatisfaction jump at the start of a re-buffering event may be approximated with the following equation:

$$F_2[n] = \begin{cases} f_2, & \text{first re-buffering event, } n = n_1; \\ f_2' \cdot Q[n-1], & \text{for all other re-buffering events;} \end{cases} \quad \text{EQ4}$$

where $f_2$ and $f_2'$ are constants which may be tuned. Using similar reasoning, $F_1[n]$ and $F_4[n]$ may be expressed as:

$$F_1[n] = \begin{cases} f_1, & \text{during first re-buffering event, } n \le n_2; \\ f_1', & \text{for all other re-buffering events;} \end{cases} \quad \text{EQ5}$$

$$F_4[n] = \begin{cases} f_4, & \text{first re-buffering event, } n = n_1; \\ f_4' Q[n-1], & \text{for all other re-buffering events;} \end{cases} \quad \text{EQ6}$$

The recovery function $F_3[n]$ is more complex. For a short duration media sessions, $F_3[n]$ may be approximated as:

$$F_3[n] = \begin{cases} f_{3,I}, & \text{first } N \text{ sec after the first re-buffering event,} \\ & n_2 \le n \le n_2 + N \\ f_{3,C}, & \text{after } N \text{ sec after the first re-buffering event,} \\ & n_2 + N \le n < n_3; \\ f'_{3,I}, & \text{first } N \text{ sec after a subsequent re-buffering event,} \\ & n_{i+1} \le n \le n_{i+1} + N; \\ f'_{3,C}, & \text{after } N \text{ sec after a subsequent re-buffering event,} \\ & n_{i+1} + N \le n < n_{i+2}; \end{cases} \quad \text{EQ7}$$

where N≈15 sec. The subscripts I and C stand for initial and continued respectively. All of these equations may be rewritten as:

$$Q[n] = \begin{cases} 5, & 0 \le n < n_1; \\ [Q[n_1-1] - f_1 \cdot (n-n_1) - f_2], & n_1 \le n < n_2; \\ [Q[n_2-1] \cdot f'_4 + f_{3,I} \cdot (n-n_2)], & n_2 \le n < n_2 + N; \\ [Q[n_2+N-1] + f_{3,C} \cdot (n-n_2-N)], & n_2 + N \le n < n_3; \\ [Q[n_{i+1}-1] \cdot f'_{2*} + f'_1 \cdot (n-n_i)], & n_i \le n < n_{i+1}; \\ [Q[n_{i+1}-1] \cdot f'_{4*} + f'_{3,I} \cdot (n-n_{i+1})], & n_{i+1} \le n \le n_{i+1} + N; \\ \begin{bmatrix} Q[n_{i+1}+N-1] + \\ f'_{3,C} \cdot (n-n_{i+1}-N) \end{bmatrix}, & n_{i+1} + N \le n < n_{i+2}; \end{cases} \quad \text{EQ8}$$

where f'2*=1−f2, f4*=1+f4 and f'4*=1+f4.

Equation EQ8 provides an accurate calculation of the signal DQS for relatively short duration media sessions. For longer form content, media sessions lasting tens or hundreds of minutes, equation EQ8 can be applied to the entire media session or to sub-intervals of the media session independently, where a sub-interval may be anywhere from 10 to 300 seconds, to balance out the impact of recency effects. When applied to sub-intervals, the final DQS score may be a simple average of the DQS scores for the sub-intervals.

The user model may account for the impact of (i) one or multiple re-buffering events, (ii) variable duration of single or multiple re-buffering events, (iii) variable location within the media session of single or multiple re-buffering events, (iv) variable media session duration and/or (v) variable start up delay. The user model may also provide adaptability to different content types and demographics (either dynamic or static). This may be accomplished by adjusting the various thresholds and rates.

The user model may be presented as a discrete function or a continuous function. The user model may provide a mapping of a video buffer model state to a level of viewer satisfaction based on a memory model supporting (i) all variations of detectable video buffer state events, (ii) all variations in media sessions durations and/or (iii) adaptability to content type and demographics.

The objective session model may calculate an objective measure of how the network delivered content to a media client and/or if the network was able to maintain real-time delivery throughout the session. The inputs into this model may comprise events generated by the hypothetical video buffer model. These inputs may be used to calculate how much a generalized and greedy media clients generally wait on the network 110 to deliver the media session.

The signal NQS may be calculated as the percentage of play duration divided by the play duration and stalled duration. Play duration may be the amount of time a hypothetical client was playing at the desired frame rate. Stalled duration may be the amount of time a hypothetical client was waiting for frames when the client should have been playing. This includes unexpected excess waiting during initial buffering.

The score can be sampled at any point where (play duration+stalled duration)>0 according to the following formula:

$$\text{Network Quality Score} = \frac{100 \cdot \text{play duration}}{\text{play duration} + \text{stalled duration}} \quad \text{EQ9}$$

In contrast to play duration and stalled duration, there may be other time intervals during a session which do not affect network quality score, such as the amount of time the player was paused and/or an expected portion of time spent waiting for frames during initial buffering.

The model of the present invention may map hypothetical video buffer state events to an objective score for delivery of streaming media over a reliable network. The model may also support all variations of hypothetical video buffer state events supporting all variations in media session durations.

Figure 9:
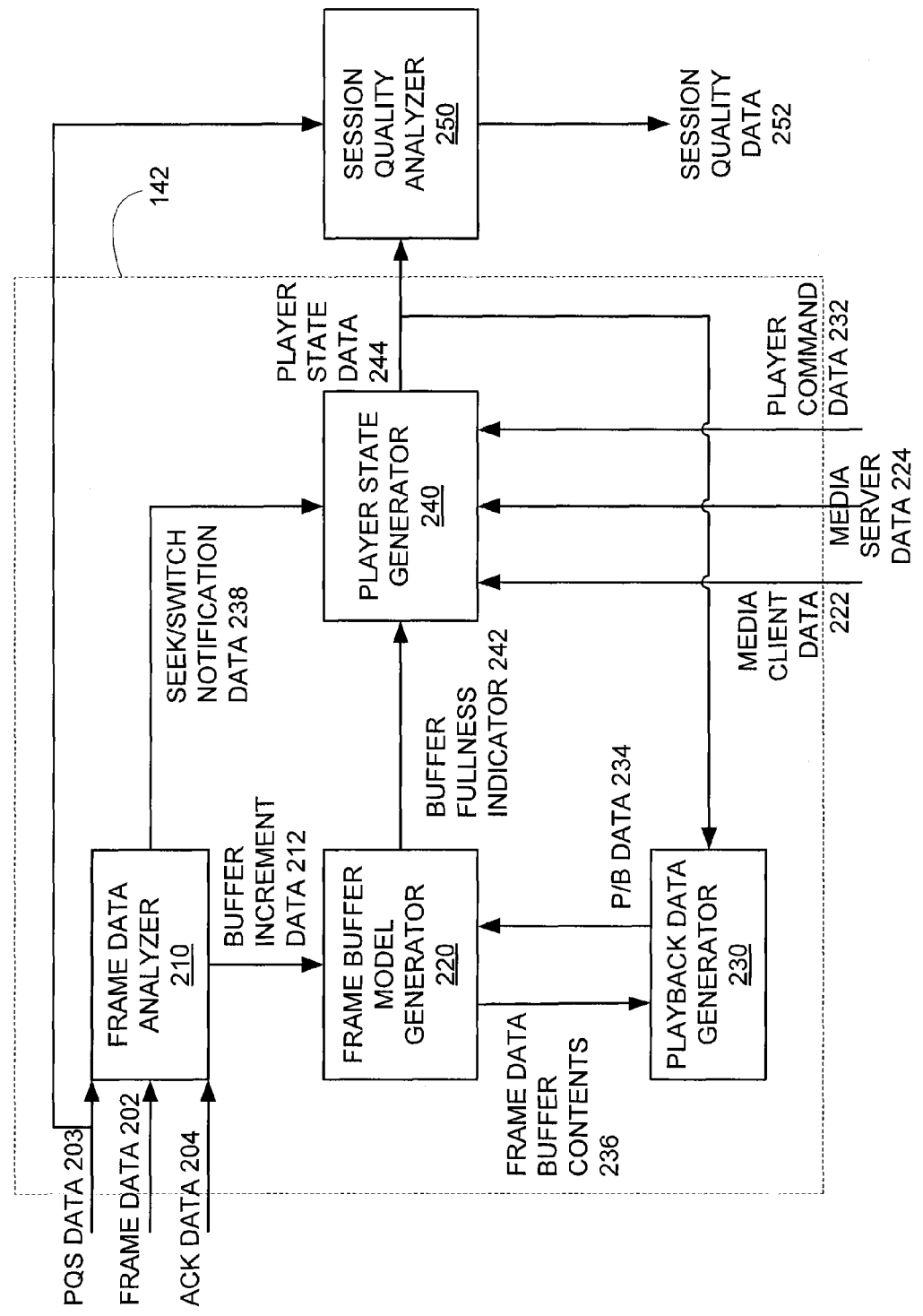
FIG. 9 is a diagram illustrating an exemplary device that includes a video buffer model block.

FIG. 9 is a diagram illustrating an exemplary video buffer model block. In particular, a device is shown as a further embodiment of video buffer model block 142 or hypothetical video buffer model block 150 for use in a network monitoring system that analyzes media session data communicated via a network between a media server and a media client. This device includes frame data analyzer 210, frame buffer model generator 220, playback data generator 230 and player state generator 240.

The frame data analyzer 210 generates buffer increment data based on frame data 202 sent from the media server to the media client and further based on acknowledgement data 204 sent from the media client to the media server. In embodiments supporting adaptive streaming, frame data analyzer 210 further generates stream switch notification data based on presentation quality data and frame data as described herein. The playback data generator 230 generates playback data 234 based on player state data 244 and optionally based on frame data buffer contents 236. The frame buffer model generator 220 generates a buffer fullness indicator 242, based on the media client data 222, the buffer increment data 212 and the playback data 234. A player state generator 240 generates the player state data 244, based on the buffer fullness indicator 242, the media client data 222 and the player command data 232.

In some embodiments, the frame data analyzer 210 operates in accordance with the media session model block 140 to generate buffer increment data 212 when the frame data 202 indicates a particular video frame sent from the media server to the media client and further when the acknowledgement data 204 indicates that that particular video frame was received by the media client. The frame buffer model generator 220 maintains the buffer fullness indicator 242 as an estimate of an amount of frame data stored in a buffer, such as a video buffer or other streaming media buffer of the media client, at any given time. In addition, the frame buffer model generator 220 maintains and stores frame data buffer contents 236 that include information such as: when media frames arrive, the size of the frames and their duration, etc. The frame buffer model generator 220 increases the estimate of the amount of frame data 202 stored in the buffer of the media client in response to the buffer increment data 212 to reflect the arrival of the new frame data 202.

When a media session begins, the player generator 240 generates player state data 244 to indicate a buffer initializing state. In some cases, player state data 244 may comprise, for example, signal PLAYER_BUFFER_EVENTS and signal EVENT_START_TIME. The frame data 202 is accumulated in the buffer of the media client. When the buffer fullness indicator 242 indicates that the estimated amount of frame data stored in the buffer reaches a first threshold value, the player state generator 240 generates player state data 244 to indicate a playback state. The playback data generator 230 generates playback data 234 that indicates the playback of a particular video frame, when the playback state data 242 indicates a playback state, provided that the frame buffer model generator indicates an appropriate frame is available for playback. The frame buffer model contents also indicate the playback duration of such a frame. In this fashion, when the player state data 244 indicates that the media client is actually playing and not in a non-playing state, for example, due to a buffer initializing or stall condition, the playback data generator 230 generates playback data 234 as each successive frame is expected to be played. In response to the playback data 234, the frame buffer model generator 220 decreases its estimate of the amount of frame data stored in the buffer of the media client, to indicate the removal of each frame that is played.

If the buffer fullness indicator 242 indicates that the estimated amount of frame data stored in the buffer of the media client has decreased below a second threshold, such as when the estimate reaches zero indicating that all of the received frame data 202 has been played, the player state generator 240 generates playback state data 244 indicates a stall state. In this case, the playback data generator 230 ceases the generation of playback data 234 until the player state generator 240 indicates a playback state in the player state data 244—when a sufficient buffer level is restored, as specified by a third threshold.

It should also be noted that the playback data generator 230 can also suspend the generation of playback data 234 when the player command data 232 indicates a pause command. Further, the generation of the playback data 234 by playback data generator 230 can be accelerated to decrement the estimate of the amount of frame data stored in the buffer of the media client at a greater rate in response to command data 232 that indicates a fast forward command. The increased frames per second rate can be indicated as a fast forward rate included in the media client data 222. In response to player command data 232 relating to a seek command that repositions the playback of the media stream of the media player, either forward or backward in the program at a new point beyond the storage in the buffer, the playback data generator 230 can generate playback data 234 to restart the initialization of the buffer at the new point.

The media client data 222 can include either default media client data corresponding to a default media player, specific media client data either computed or retrieved from a database based on the media session data or otherwise corresponding to the particular media client in use, or can indicate hypothetical media client data corresponding to a hypothetical media client, such as a conservative client, a typical media client, an aggressive (greedy) media client, or other hypothetical media client. The media client data 222 can include a buffer depth used to indicate thresholds used to determine the buffer fullness required for initial playback and/or resumption of playback after re-buffering events, one or more fast forward frame rates corresponding to different fast forward speeds, and other media client information used by the device to model the conditions of the video buffer.

Session quality analyzer 250 is further included to implement a further embodiment of user model block 144 or NQS session model block 152. The session quality analyzer 250 generates session quality data 252 based on the playback state data 244. For example, the session quality analyzer 250 generates a playback duration and a stall duration corresponding to the media session based on the playback state data 244 and generates the session quality data 252 based on the playback duration and the stall duration.

The frame data analyzer 210, frame buffer model generator 220, playback data generator 230, player state generator 240 and session quality analyzer 250 can be implemented using a single shared processing device or a plurality of processing devices. Such a processing device or devices may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the frame data analyzer 210, frame buffer model generator 220, playback data generator 230, player state generator 240 and/or session quality analyzer 250 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The further operation of the frame data analyzer 210, frame buffer model generator 220, playback data generator 230, player state generator 240 and session quality analyzer 250 can be described in conjunction with the example that follows. In particular, the frame buffer model generator 220 operates a video or audio frame queue that grows based on the duration/size of frames that arrive and are acknowledged at the client device over the network as indicated by buffer increment data 212 generated by frame data analyzer 210 in response to frame data 202 and acknowledgement data 204. Frame arrival information may optionally be compressed by consolidating the information for several consecutive frame arrivals into a single "frame sequence arrival" entity in the queue, which represents the total size and total playback time of the group of frames. The purpose of this compression is to reduce memory requirements in the system. The frames are removed in a decode order at a video play rate (e.g. 24 frames per second), based on the timestamps of the video frames and further based on the playback data 234 generated by playback data generator 230.

Player state generator 240 operates based on several unique and possibly dynamically changing thresholds that can be device and player dependent and optionally indicated by media client data 222 and or can be website dependent and optionally indicated by media server data 224. The first threshold is the amount of playback time represented by the frames in the buffer that is needed in the video buffer before the first video frame is removed and played at the beginning of the media session. A second threshold, (e.g. zero corresponding to a buffer empty condition) causing the playback to stall. The third threshold is the amount of playback time represented by the frames in the buffer that is needed in the video buffer before the first video frame is removed and played after a stall.

The device of FIG. 9 can maintain an event-driven, frame-accurate model of the input buffer state for a number of video clients on a network. The frame data analyzer 210 can detect frame arrivals at each media client based on frame boundary positions in the traffic to the client, and monitoring of the acknowledgements from the client that confirm the arrival of that data. Based on information in the frame data 202 indicating with network flow each frame was delivered in, the frame data analyzer 210 detects when a player has performed a "seek" operation and sends a seek indication to the playback state generator 240 as part of seek/switch notification data 238. The playback state generator 240 can track the playback state of each media client over time including the initiation of a seek operation; the initiation of a stall event due to the buffer emptying; and the resumption of playback after stalling due a frame arrival resulting in sufficient time in the buffer to exceed a required threshold. The frame buffer model generator 220 can track the playback of each frame and its removal from the frame data buffer based on playback data 234 when the playback state generator 240 indicates a playing state; discard frames in the buffer in response to playback data 234 because player state data 244 indicates a player has performed a "seek" operation into a different segment of the video, and transitioning the model to be driven by the arrival of frames required to play from this new playback segment. The player state generator 240 can also reflect different site, device, and player behaviors and characteristics based on a small number of thresholds that represent the amount of playback time required in the buffer to begin or resume playback.

The frame data analyzer 210 can intelligently detect "spurious" flows of media traffic that are initiated by some players, but then subsequently ignored (never used for playback). These players may request multiple versions of the same content at essentially the same time, and then ignore and terminate all but one flow. Properly detecting and discarding such flows allows the device to maintain a frame-accurate estimate of the client's buffer and its playback state. To properly detect such flows and maintain accuracy of the client buffer model, the frame data analyzer may update the model of the buffer with a delay of up to several seconds from the latest data that has been received. This method provides a look-ahead window into the future for deciding on which flows may be spurious and which may be valid, based on the frame data arrival information that is available for each flow.

In the case of adaptive streaming protocols, the frame data 202 includes information that identifies which of the multiplicity of available streams each frame is a part of. Based on the amounts of data arriving from various streams, their timestamps and arrival times, the frame data analyzer 210 can intelligently detect stream switch (quality switch) events, as well as seek events and sends a switch indication to the playback state generator 240 as part of seek/switch notification data 238. The detection of these events determines which frames are added to the frame buffer model generator 220. The playback state generator 240 can indicate initiation of a seek operation as player state data 244.

As discussed above, instead of basing playback data 234 and player state data 244 on media client data 222 corresponding to the characteristics of the actual media client involved in the media session, the device can implement a hypothetical video buffer model. The purpose of the hypothetical video buffer model is not to estimate the true client buffer fullness and resultant QoE, but instead, it is intended to expose any deficiencies in the ability of the network to deliver the needed session in real-time and provide a consistent evaluation of network performance across a variety of playback devices. To do this, the parameters of the media client data 222 can be set to consistent values regardless of the actual media client being used. The values may represent an aggressive, conservative, or typical client, in terms of the amount of data required to start or resume playback.

In one example, the hypothetical video buffer model is still filled at the network rate and emptied at the play rate. However, once the buffer is drained, the first frame to be removed is removed as soon as it arrives. In effect, the third threshold required to re-buffer after a stall condition is set to a single frame of data. This hypothetical video buffer model is a "greedy" buffer model that is consistent for all media sessions, and allows calculation of a normalized and more objective score. Implementation of the hypothetical video buffer model allows precise modeling of the fullness of a "greedy" media client's video buffer by tracking frame arrivals at the media client and assuming fixed and aggressive site, device, and player behavior.

The modeling of the client buffer state for a media player and the generation of the player state data 244 can be useful for multiple reasons. The player state data 244 can be used by the session quality analyzer 250 to directly compute key performance indicators (KPIs) for the video sessions based on the modeled events, such as the number of stalls and their duration, and the amount of data in the buffer over time, etc. The timing of playback and stall events can also be used by the session quality analyzer 250 in the calculation of higher-order QoE metrics or quality scores. Similarly, in embodiments supporting adaptive bitrate streaming, session quality analyzer 250 can also consider presentation quality signals, such as PQS described herein, which may be driven by stream switch events. Session quality analyzer 250 can generate session quality data 252 such as user model 144 generation of DQS 120 and objective session model 152 generation of NQS 122 or the generation of other session quality data.

Figure 10:
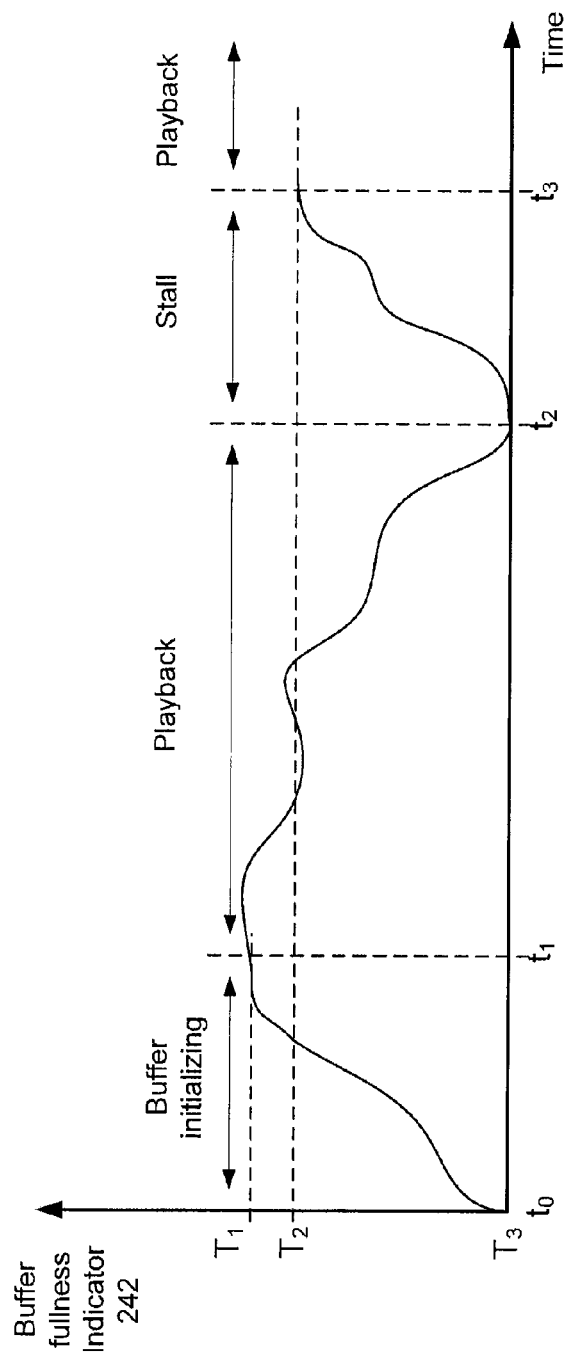
FIG. 10 is a diagram illustrating an exemplary analysis of video buffer fullness.

FIG. 10 is a diagram illustrating an example analysis of video buffer fullness. In particular, an estimated amount of video buffer fullness is presented over time as indicated by buffer fullness indicator 242. When a media session begins at time t0, the player state generator 240 generates player state data 244 to indicate a buffer initializing state. At time t1 the buffer fullness indicator 242 indicates that the estimate of the amount of frame data stored in the buffer reaches a first threshold value T1. In response, the player state generator 240 generates player state data 244 to indicate a playback state. After time t1 the buffer fullness indicator 242 is incremented by buffer increment data 212 when new frames are received and acknowledged and decremented based on playback data as the frames are presumed to be played. In the example shown, at time t2, the buffer fullness indicator 242 indicates that the estimated amount of frame data stored in the buffer of the media client has decreased below a threshold T3, such as when the estimate reaches zero indicating that all of the received frame data 202 has been played. In response, the player state generator 240 generates playback state data 244 to indicate a stall state. At time t3 the buffer fullness indicator 242 indicates that the estimated amount of frame data stored in the buffer reaches a threshold value T2. In this case, the player state generator 240 indicates a playback state in the player state data 244 and the playback data generator 230 resumes the generation of playback data 234 as long as the player command data 232 continues to indicate a playback command. In this example, the session quality analyzer 250 can calculate session quality data 252 based on EQ8 and/or EQ9.

Figure 11:
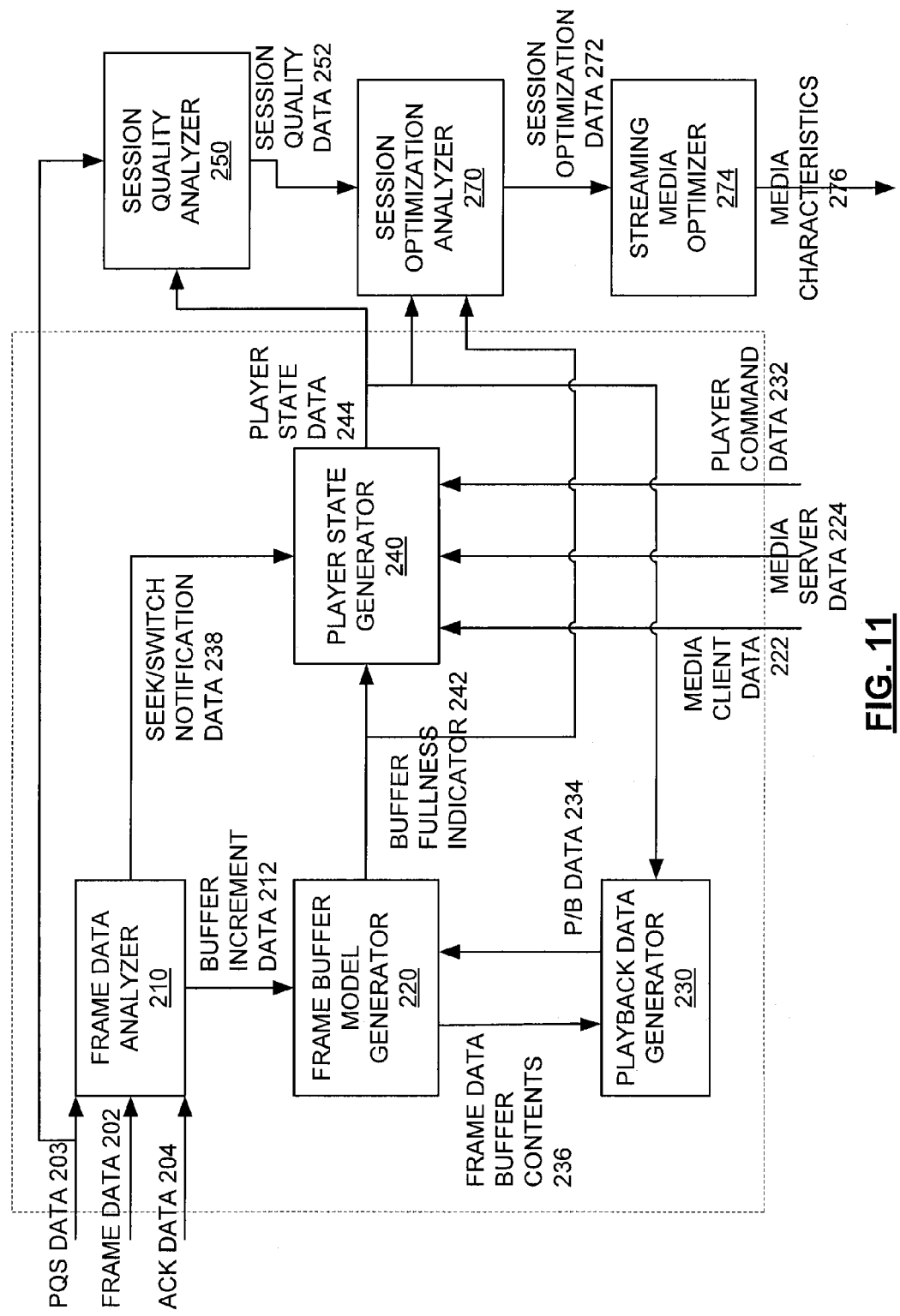
FIG. 11 is a diagram illustrating an exemplary device that includes a video buffer model block.

FIG. 11 is a diagram illustrating another exemplary device that includes a video buffer model block. In particular, a device is shown that includes many common elements described in conjunction with FIG. 9 that are referred to by common reference numerals. In addition, a session optimization analyzer 270 is included that analyzes buffer fullness indicator 242, playback state data 244 and optionally session quality data 252 from session quality analyzer 250 in order to generate session optimization data 272. In some embodiments, the session optimization data 272 indicates particular session optimization parameters and/or indicates optimization decisions in a format that can be used by a streaming media optimizer 274 to modify one or more characteristics 276 of the generated media traffic that is transmitted on the network with the goal of achieving better streaming media performance.

The session optimization analyzer 270 and streaming media optimizer 274 can be implemented using a single shared processing device or a plurality of processing devices. Such a processing device or devices may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the session optimization analyzer 270 and/or streaming media optimizer 274 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 12:
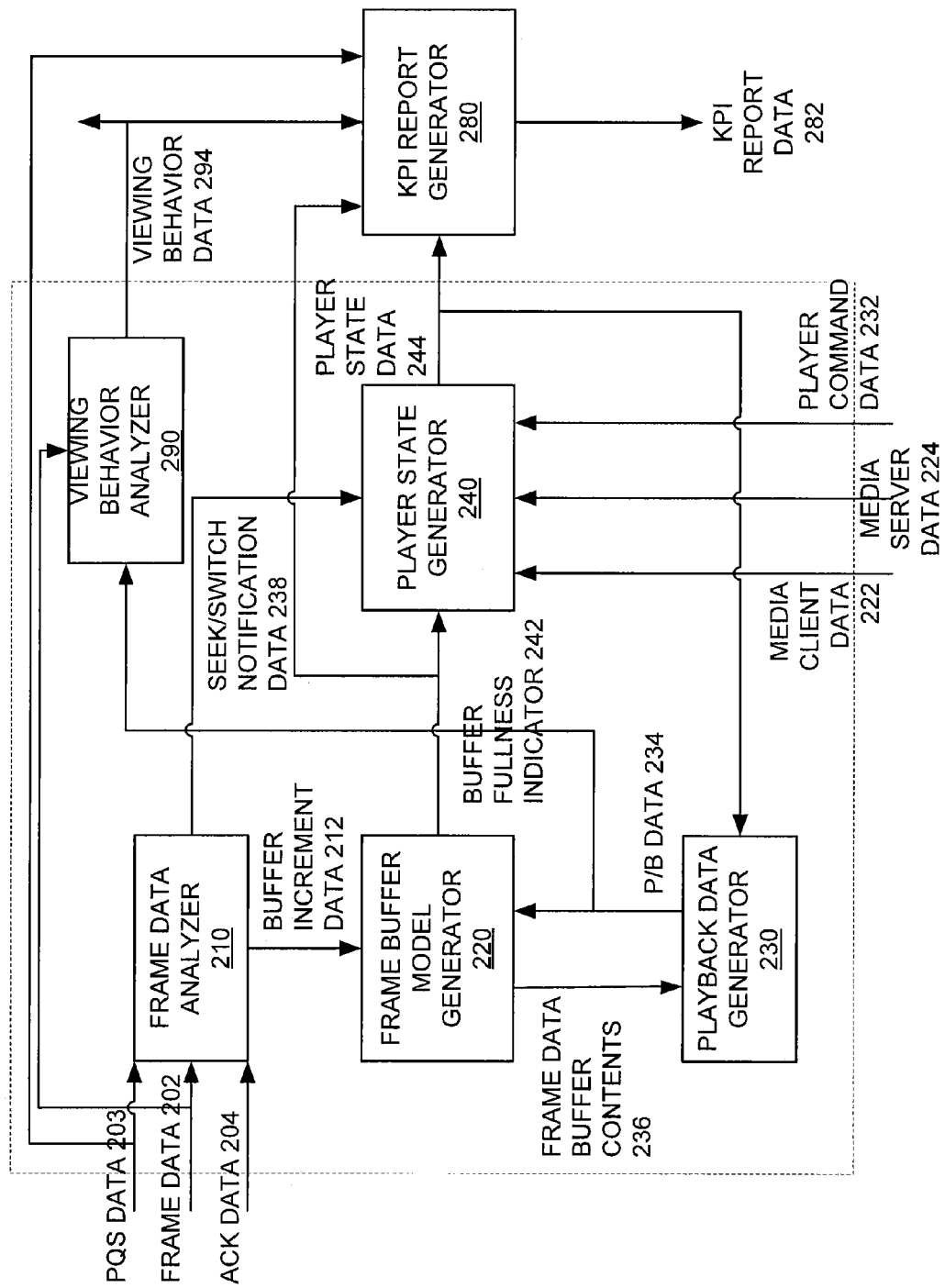
FIG. 12 is a diagram illustrating an exemplary device that includes a video buffer model block.

FIG. 12 is a diagram illustrating another exemplary device that includes a video buffer model block. In particular, a device is shown that includes many common elements described in conjunction with FIG. 9 that are referred to be common reference numerals. In addition, a viewing behavior analyzer 290 is included that generates viewing behavior data 294 based on frame data 202 that indicates when a frame is streamed and playback data 234 that indicates when a frame is played. The viewing behavior data 294 can be generated to indicate, for example, the streamed duration and the watched duration for various media traffic.

A key performance index (KPI) report generator 280 generates KPI report data 282 based on the viewing behavior data 294, the buffer fullness indicator 242 and the player state data 244. The KPI report data 282 can include streamed duration, watched duration, the number, frequency and duration of stalls, an average, minimum or maximum buffer fullness and other performance indicators of one or more media sessions. In the case of adaptive bitrate streams, the KPI report data can also include the number, location and duration of stream switch events and associated quality levels and/or operating points for each switch. In some embodiments, the average, minimum or maximum buffer fullness are calculated by the KPI report generator 280 by tracking the values of the buffer fullness indicator 242 however, in a further embodiment, the buffer fullness indicator 242 includes instantaneous values of buffer fullness as well as other statistics such as, median, average, minimum and maximum buffer fullness calculated for a particular media session.

The viewing behavior analyzer 290 and KPI report generator 280 can be implemented using a single shared processing device or a plurality of processing devices. Such a processing device or devices may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the viewing behavior analyzer 290 and/or KPI report generator 280 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 13:
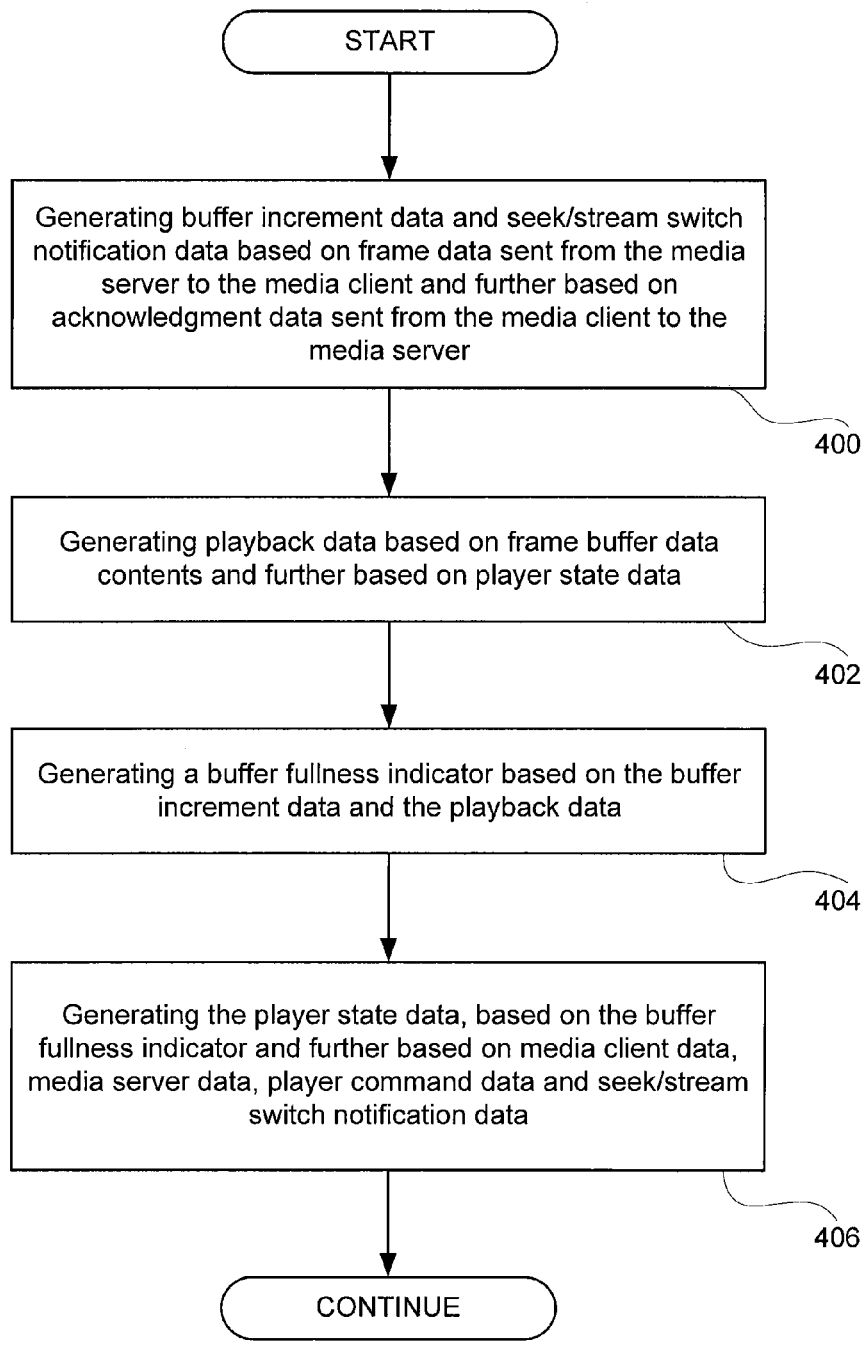
FIG. 13 is a diagram illustrating an exemplary method.

FIG. 13 is a diagram illustrating an exemplary method. In particular, a method is presented for use in conjunction with one or more functions and features described in conjunction with FIGS. 1 to 10. In step 400, buffer increment data is generated based on frame data sent from the media server to the media client, acknowledgement data sent from the media client to the media server, and further based on seek/stream switch notification data, such as seek/switch notification data 238. In step 402, playback data is generated based on frame data buffer contents and further based on player state data. In step 404, a buffer fullness indicator and the frame data buffer contents are generated, based on the buffer increment data and the playback data. In step 406, the player state data is generated based on the buffer fullness indicator and further based on media client data, media server data, player command data, and seek/stream switch notification data.

The buffer fullness indicator can indicate an estimate of an amount of frame data stored in a buffer of the media client. The buffer increment data can be generated when the frame data indicates a particular video frame sent from the media server to the media client and step 404 can include increasing the estimate of the amount of frame data stored in the buffer of the media client in response to the buffer increment data. The playback data can indicate the playback of a particular media frame when the playback state data indicates a playback state and step 404 can include decreasing the estimate of the amount of frame data stored in the buffer of the media client in response to the playback data.

The playback state data can indicate a playback state when the estimate of the amount of frame data stored in the buffer of the media client increases to a first threshold. The playback state data indicates a stall state when the estimate of the amount of frame data stored in the buffer of the media client decreases to a second threshold. The first threshold can be generated based on at least one of: media server data and the media client data. The media client data can include at least one of: default media client data; specific media client data corresponding to the media client; and hypothetical media client data.

Figure 14:
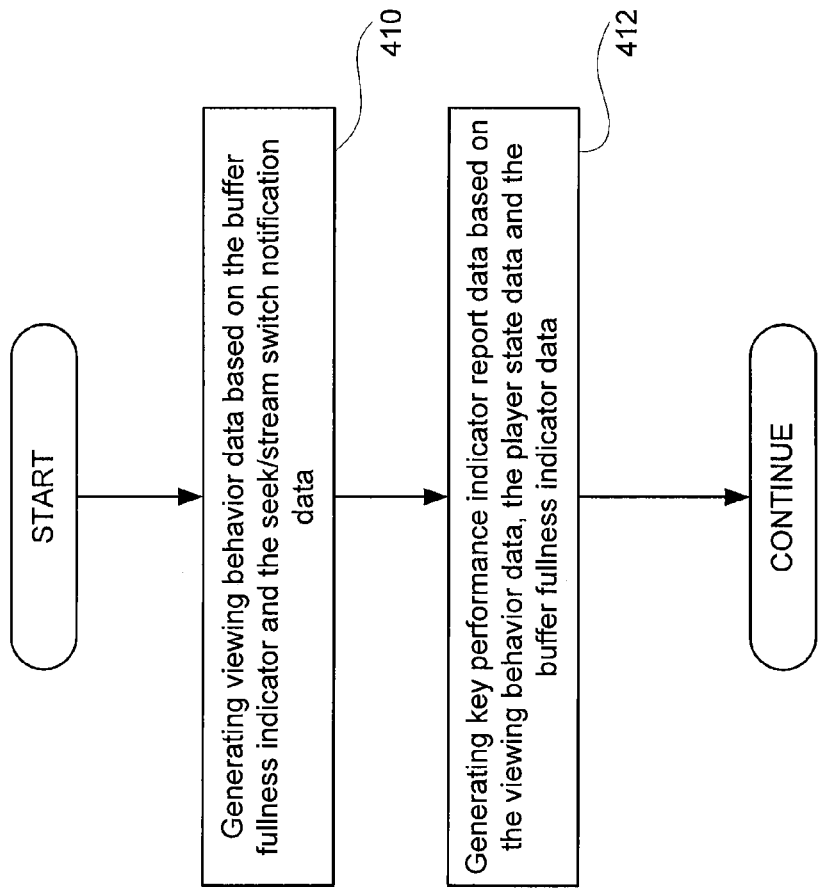
FIG. 14 is a diagram illustrating an exemplary method.

FIG. 14 is a diagram illustrating an exemplary method. In particular, a method is presented for use in conjunction with one or more functions and features described in conjunction with FIGS. 1 to 13. In step 410, viewing behavior data is generated based on the frame data, and seek/stream switch notification data. In step 412, key performance indicator (KPI) report data is generated based on the viewing behavior data, the player state data, and the buffer fullness indicator data.

Figure 15:
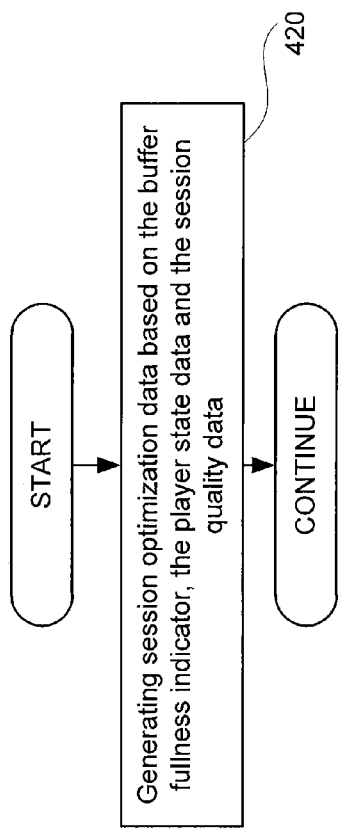
FIG. 15 is a diagram illustrating an exemplary method.

FIG. 15 is a diagram illustrating an exemplary method. In particular, a method is presented for use in conjunction with one or more functions and features described in conjunction with FIGS. 1 to 14. In step 420, session optimization data is generated based on the buffer fullness indicator and the player state data.

Figure 16:
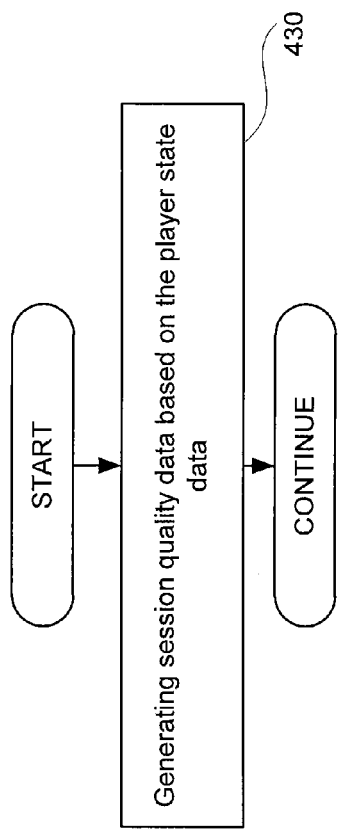
FIG. 16 is a diagram illustrating an exemplary method.

FIG. 16 is a diagram illustrating an exemplary method. In particular, a method is presented for use in conjunction with one or more functions and features described in conjunction with FIGS. 1 to 15. In step 430, session quality data is generated based on the playback state data. Generating the session quality data can include generating a playback duration and a stall duration corresponding to the media session based on the playback state data.

Figure 17:
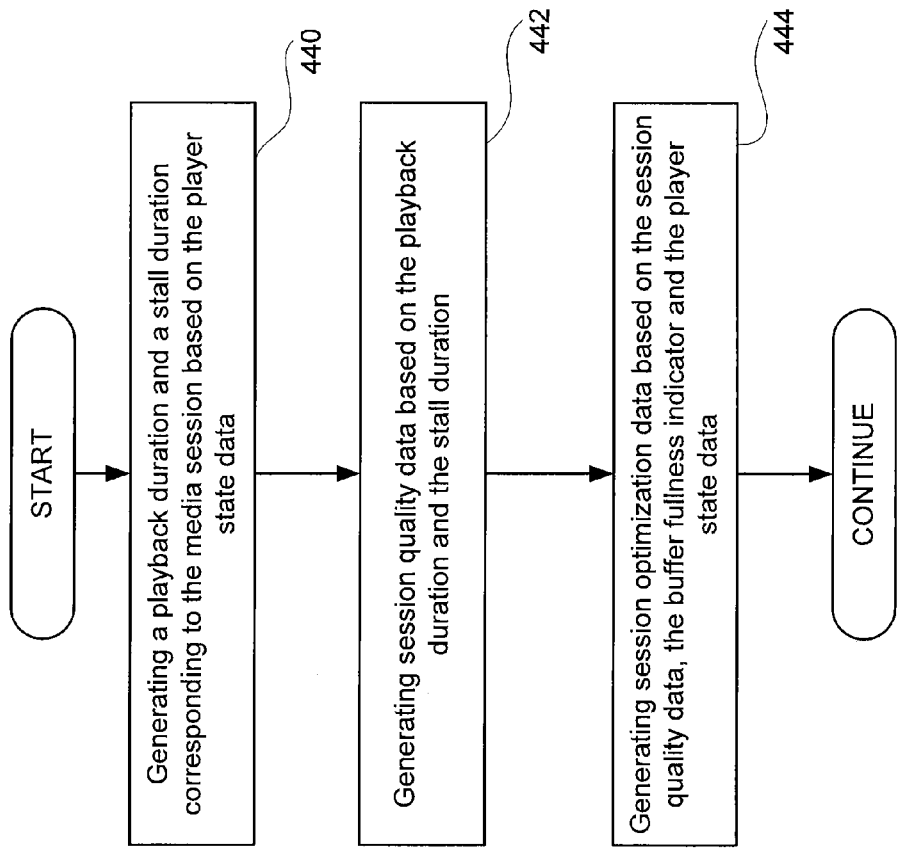
FIG. 17 is a diagram illustrating an exemplary method.

FIG. 17 is a diagram illustrating an exemplary method. In particular, a method is presented for use in conjunction with one or more functions and features described in conjunction with FIGS. 1 to 16. In step 440, a playback duration and a stall duration are generated corresponding to the media session based on the playback state data. In step 442, session quality data is generated based on the playback duration and the stall duration. In step 444, session optimization data is generated based on session quality data, the buffer fullness indicator and the player state data.

As described herein, the DQS may be defined as a quality score for a media session which measures the impact of the network on the viewer experience (e.g., an estimate of a subjective level of satisfaction). This score can be determined relative to a hypothetical perfect transmission in which server, client and network resources facilitate delivery of the highest possible quality media session. In some embodiments, DQS may be computed on a mean opinion score (MOS) scale in the range of 1 to 5. However, in other embodiments, the DQS need not correspond directly to a MOS score. DQS can be considered as being independent of the encoding quality of the content.

Initial DQS algorithms were developed for non-adaptive streaming technologies such as HTTP progressive download, and thus ignore source quality. However, adaptive streaming technologies routinely adjust video/audio quality to compensate for network throughput variations. It is poor or degraded DQS that causes the client to request a lower quality level. Therefore the perceived impact of the delivery network to the viewer is no longer limited to re-buffering events; it can include dynamic changes in video quality. That is, it may be the network's fault when visual quality is reduced.

As noted, in adaptive streaming technologies, it is typically the client device that decides when to trigger a switch to a different operating point or quality level. In addition to differing in encoding bit rate, operating points may also differ in resolution and frame rate.

The buffer model blocks 144 and 152 generally estimate video playback buffer fullness of the end user's video player. In the case of adaptive streaming, the buffer model may also consider when and why various clients switch (or try to switch) between operating points, particularly when switching to a higher (i.e., higher bit rate, frame rate, etc.) operating point. For example, many clients test the network's ability to stream the next higher quality stream while continuing to download content at the current quality level. This results in video content for multiple operating points traversing the same segment of the network to the client. Accordingly, the buffer model must distinguish such events to determine if and when a switch has actually occurred and thus maintain an accurate buffer model across operating point switches. This determination is based on modeling specific client and device behavior.

In particular, the buffer model should distinguish and monitor concurrent downloads of the same and/or different operating points for one or more segments of a stream; determine which of the concurrent OPs is playing; determine when a change in operating points has occurred (to ensure the buffer model is correctly modeling fullness levels); maintain model accuracy when changing operating points; support seeking (backwards and forwards) across operating points and segments.

The buffer model should do all of the above in a device-configurable and video service-configurable manner, in particular supporting different adaptive streaming technologies such as Apple™ HTTP Live Streaming, Microsoft™ Silverlight™ Smooth Streaming, Adobe™ Flash™ dynamic streaming, Netflix™, and the like.

Figure 18:
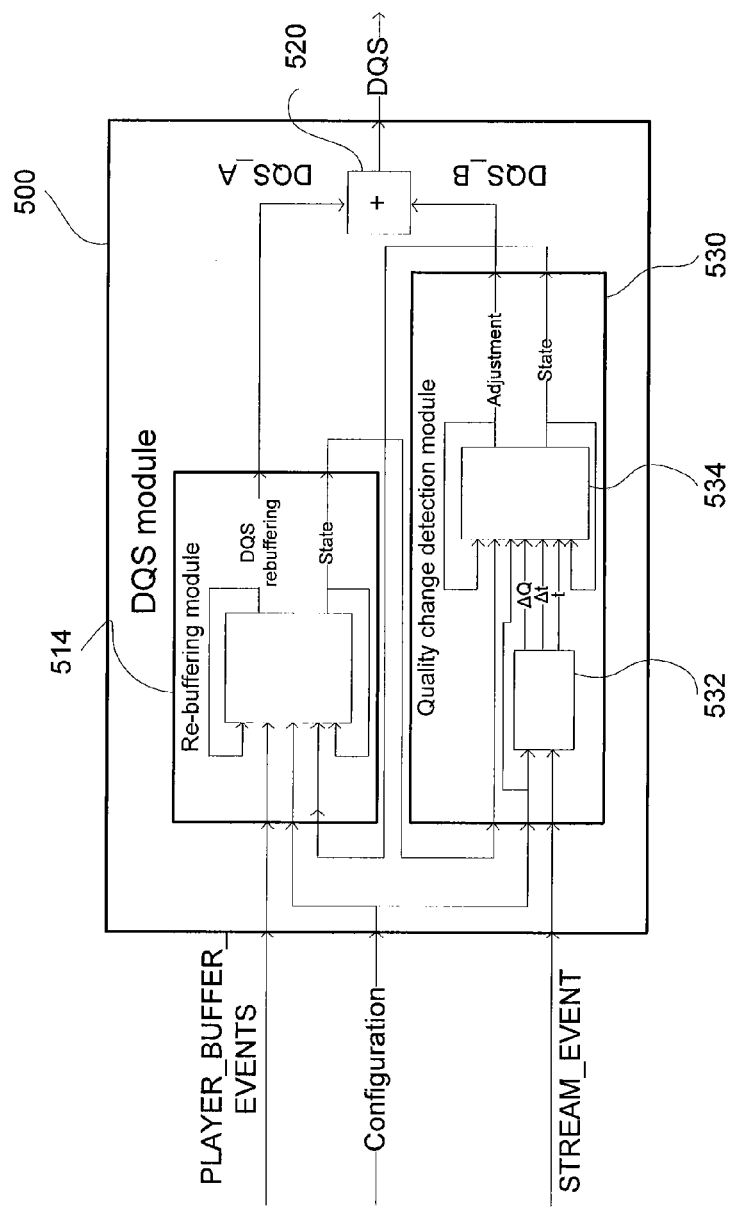
FIG. 18 is a diagram illustrating another exemplary DQS block.

Referring now to FIG. 18, another exemplary DQS block is shown. DQS model block 500 may comprise a re-buffering module 514, a quality change detection module 530 and a signal generation module 520. In the case of non-adaptive bitrate streaming, where the primary perceptible impact of the network on the QoE of the media session is re-buffering, re-buffering module 514 may be considered as generally analogous to user model block 144. However, in the case of adaptive bitrate streaming, where both re-buffering and stream switching can be perceptible impacts of the network on the QoE of the media session, re-buffering module 514 can be supplemented with quality change detection module 530, to provide DQS module 500.

If adaptive streaming is supported, re-buffering module 514 may be configured to account for various factors that may differ in an adaptive streaming environment. For example, when watching a long-form video, viewers may tolerate a higher initial buffering delay than when watching a short-form video. In such cases, viewer expectations of an acceptable buffering delay may increase from, for example, 3 seconds to 12 seconds or more.

In addition, re-buffering module 514 may receive additional state information input from quality change detection module 530 and may provide playback state information output to quality change detection module 530.

Quality change detection module 530 may comprise several sub-modules, including event type detection module 532 and impairment estimation module 534. In some embodiments, these modules may be combined or further subdivided.

Generally speaking, quality change detection module 530 is configured to determine whether a change in operating point will manifest as a change in quality level that is perceptible to the viewer.

Event type detection module 532 can be configured to receive signals relating to stream switch events (e.g., signal STREAM_EVENT), and to detect stream switch events. In particular, event type detection module 532 may detect multiple operating point changes in the stream, significant operating point changes, a high rate of operating point changes and a lack of operating point changes where the stream is at a lower quality operating point. Event type detection module 532 may also be configured detect cumulative changes in operating point that generally proceed in a single direction, but which may not be perceptible individually (e.g., a "ramped" switch).

Impairment estimation module 534 can be configured to determine the impact of each event type (as determined by event type detection module 532) on quality level as perceived by the viewer. The perceived quality level may be relevant to QoE measures because the viewer's perception of network delivery can be affected by stream switch events that manifest in a noticeable quality change (whether an increase or decrease or quality). Conversely, if the operating point change is not noticeable, then the switch may not alter viewer perception of network quality.

Signal generation module 520 may be provided to receive signal DQS_A output from re-buffering module 514 (corresponding to signal DQS from DQS block 114) and signal DQS_B from quality change detection module 530. Signal generation module 520 may be configured to add or combine signals DQS_A and DQS_B in a suitable manner, such as adding, multiplying, applying scaling factors, and the like. Accordingly, the output of both re-buffering module 514 and quality change detection module 530 can be used to compute an overall signal DQS.

In some embodiments, output of the signal generation module 520 may be computed as shown in EQ10.

$$DQS = DQS\_A + DQS\_B \qquad \text{EQ10}$$

where DQS_A is in the range of 1 to 5 and DQS_B is in the range of 0 to −4.

Signal DQS_A may be referred to as an initial delivery quality signal. Signal DQS_B may be referred to as an adjustment signal.

As noted, both modules can share state information. For example, client playback state that is detected by re-buffering module 514 may be output to quality change detection module 530, and subsequently used in a determination of the impairment level.

Conversely, quality change detection module 530 may output its own state information, which may be used by re-buffering module 514. This feedback can be used to account for the subtle combined effect of having both re-buffering events and noticeable stream switch events. EQ10 allows for combining both event types in an additive fashion, however more subtle modulations of the recovery and dissatisfaction constants in both models may be applied.

Both modules share a number of inputs. Input signal PLAYER_BUFFER_EVENTS can be used to indicate that a buffer model event has occurred. Examples of such events include: playing, paused, re-buffering, initial buffering, and stream switch, as described herein. Event indications may specify the time offset 't' from the beginning of the video (e.g., in ms) to identify when the event occurred. In the event of an initial buffering indication, the time offset may be non-zero where a skipping action (fast forwarding or rewinding) has occurred. In the event of a stream switch indication, the indication may also include an indication of the new operating point, and whether the new operating point is the best operating point.

In some cases, there may be additional events associated with a media session stream start-up. For example, there may be an event provided to indicate an initial presentation quality and whether the initial presentation quality represents a best possible operation point for an adaptive streaming session. Another event may be transmitted in special cases to indicate that a lower operating point is expected (e.g., in the case of a mobile device).

A Configuration signal may comprise a set of configuration parameters used by re-buffering module 514 and quality change detection module 530. These parameters may be related to measures such as viewer dissatisfaction, recovery rates and various delays (e.g., acceptable initial buffering delay).

Configuration signals may comprise receiving device configuration parameters, transmitting device configuration parameters, or both. Configuration parameters may be specific to sites/services (e.g., YouTube™ or Netflix). For example, a configuration parameter specific to YouTube™ may specify that startup delay is on the order of 5 seconds. Accordingly, when a YouTube™ media session is detected, the buffer model may be configured to account for the startup delay. Unknown sites/services or devices/media players may have default configuration parameters.

Configuration parameters may be specific to devices/media players. For example, a particular player may be configured not to switch operating points to a higher quality level following a switch to a lower quality level (e.g., Netflix™ player on a Microsoft™ Xbox™). Accordingly, when a media session with an Xbox™ is detected, it may be determined not to penalize the media player for not increasing its operating point when computing DQS_B.

Signal STREAM_EVENT can be used to indicate that a stream switch event (e.g., a switch between operating points) occurred at time offset 't' and to indicate the new operating point quality level 'Q'. The quality level 'Q' may be provided as a PQS value. In some cases, the PQS value provided with signal STREAM_EVENT may be generated by an external module.

Referring now to FIG. 19, there are shown exemplary plots of two related quality signals with respect to time. FIG. 19(*a*) illustrates a plot of a presentation quality score (PQS) signal over time. FIG. 19(*b*) illustrates a plot of DQS over the same time period.

The PQS signal may be modeled or generated, for example internally, by impairment estimation module 534. The PQS axis is shown using the following general quality levels, which may differ from generic MOS scores: Perfect (sharp, smooth playback); Very Good (slightly soft); Good (some blockiness); Satisfactory (blocky and other artifacts); Poor (very blocky, difficult to distinguish details); Very poor (sub-optimal frame rate).

Both plots illustrate a single, identical media session with a large variety and number of operating point changes, reflecting a variety of PQS conditions.

At time t=1 min, there is a short operating point change corresponding to a stream switch to a lower quality level then back to a higher quality level. The operating point change manifests in a change in the PQS signal, however impairment estimation module 534 determines that the change does not constitute a significant event, and therefore the changes do not impact DQS.

However, between t=2 min and t=3 min, a series of short PQS changes occur. Impairment estimation module 534 determines that these oscillating quality changes are cumulatively perceptible. Accordingly, due to the cumulative effect of these changes, the DQS is reduced.

Between t=3 min and t=4 min, there is a single stream switch to an operating point at an even lower quality level. Impairment estimation module 534 determines that DQS should be further reduced.

Further changes between t=4 min and t=5 min are determined not to be perceptible.

Quality begins to improve beginning at t=5 min, with changes to a higher operating point. Accordingly, DQS begins to improve.

In general, DQS may be reduced more readily than it is increased, which can be used to reflect viewer perceptions more accurately. That is, viewers may not perceive improved quality as readily as deteriorated quality.

Figure 20:
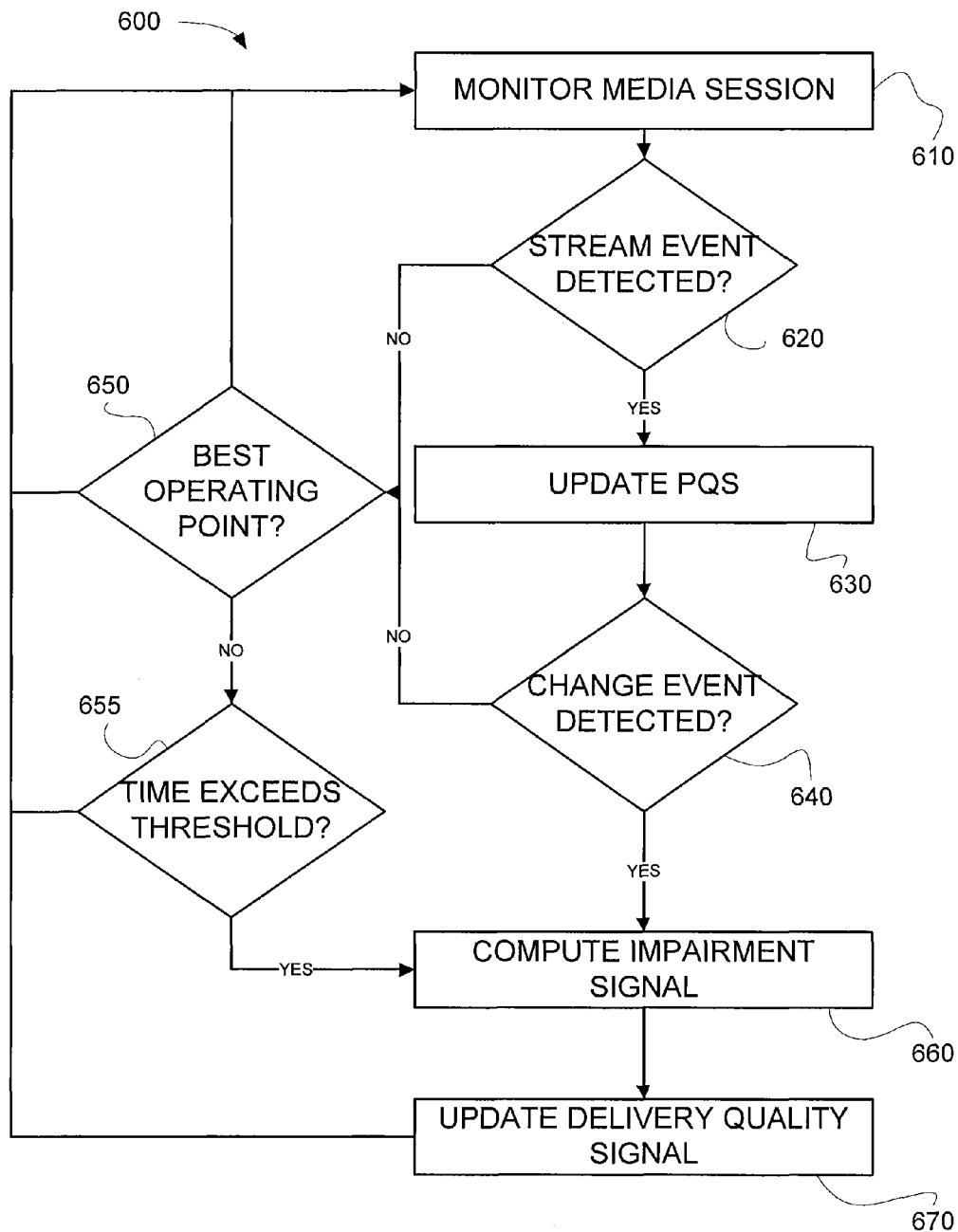
FIG. 20 is a diagram illustrating an exemplary quality change detection process.

Referring now to FIG. 20, there is illustrated an exemplary quality change detection process, such as the quality change detection process performed by quality change detection module 530.

Quality change detection process 600 begins at 610 by monitoring a media session. For example, quality change detection module 530 may monitor for inputs associated with a media session, such as a stream switch event and a Configuration change. In addition, inputs from re-buffering module 514 may also be monitored.

If a stream switch is detected, at 620, then a PQS signal may be updated accordingly at 630 based on the 'Q' value in signal STREAM_EVENT. For example, if a stream switch event corresponding to a stream switch from a first operating point to a second operating point is detected, the PQS may be adjusted accordingly, either up or down as appropriate to reflect the new quality level of the stream. In general, there may be a high degree of correlation between the occurrence of stream switch events (e.g., changes in operating point) and changes in the PQS signal.

Optionally, if a stream switch event is not detected, then a determination may be made at 650 whether the media session is already at a "best" operating point. The best operating point may represent an absolute highest quality level, or alternatively, may represent a relative highest quality level for a particular client device. For example, a smartphone may not be capable of decoding and rendering a highest possible bit rate. Accordingly, the best operating point may be set to a different operating point for the smartphone.

The absence of stream switch events switching to a higher quality level may be perceived by viewers, due to increasing viewer sophistication and expectations, and may be perceived as impairment. Viewers may consider that a lower quality level delivered by a service that uses adaptive streaming (or that provides multiple quality levels) may be the result of reduced network throughput. Accordingly, an impairment penalty may be optionally imposed when a media session fails to switch to an operating point with a higher quality level. Detection of a failed or missing stream switch may be based on a number of factors, such as: i) a current operating point that does not represent a best possible quality level; ii) the current (non-best) operating point persists without improvement for a predetermined threshold time period (e.g., 60 seconds).

Optionally, a measure of video buffer fullness can be used to determine if a missing stream switch is due to a network impairment. For example, if half of the typical buffering time is not in the client buffer and the media session is at a low quality operating point for an extended period of time, then a missing stream switch can be detected.

The effective impairment associated with a missing stream switch may be computed in a number of ways. For example, a simple subtractive approach may be used, as in EQ11.

$$\Delta PQS = Q_{highest\_quality\_level} - Q_{current\_quality\_level} \quad \text{EQ11}$$

Accordingly, if the media session is not at the best operating point, a determination may be made at 655 whether a predetermined threshold time limit has elapsed without the client switching to an operating point at a higher quality level. If the time limit has elapsed, the failure of the client to switch to the higher operating point may be used to compute an impairment factor at 660.

At 640, the PQS signal obtained at 630 may be monitored to determine if a quality change event has occurred. The quality change event may be detected, for example, by event type detection module 532. Quality change events are changes in the stream quality that may be perceptible to a viewer of the stream, and may be based on multiple changes in the PQS signal, on significant changes in the PQS signal, on a high rate of changes in the PQS signal, on a ramp in the PQS signal or on a lack of changes in the PQS signal, as described herein.

At 660, an adjustment signal, such as signal DQS_B, can be updated based on the quality change event, for example by impairment estimation module 534. The change to the adjustment signal may correspond to an adjustment amount or an adjustment factor.

Finally, at 670, the adjustment signal, such as DQS_B, may be used to update a delivery quality signal, such as signal DQS.

Referring now to FIG. 21, there are shown exemplary plots of two further quality signals with respect to time. FIG. 21(*a*) illustrates a plot of a presentation quality signal, such as that generated internally by quality change detection module 530. FIG. 21(*b*) illustrates a plot of DQS over the same time period.

In FIG. 21(*a*), it can be seen that the PQS remains constant, at a "good" level, for an extended period. However, the "good" level represents an operating point that is at a quality level lower than the "best" operating point. As described herein, DQS may be reduced as shown in FIG. 21(*b*) to reflect that the player is not improving the stream quality.

Figure 22A:
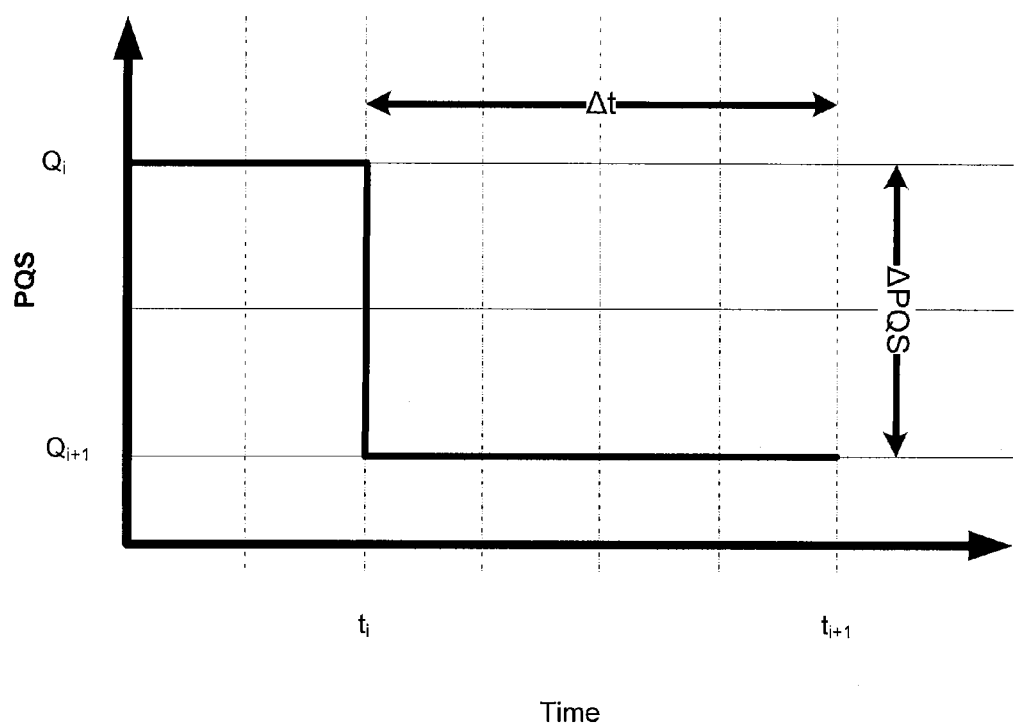
FIG. 22(a) illustrates an exemplary plot of PQS over a predetermined time window corresponding to a single stream switch event.
Figure 22B:
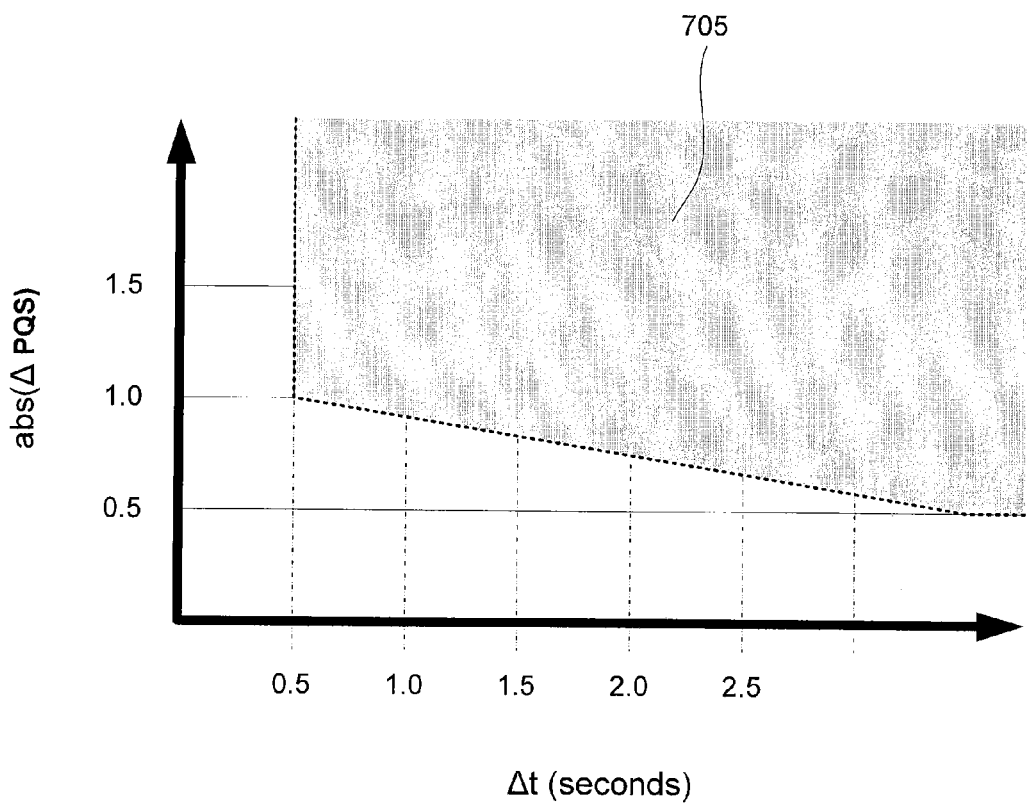
FIG. 22(b) illustrates an exemplary detection region plot.

Referring now to FIGS. 22(*a*) and 22(*b*), in FIG. 22(*a*) there is shown an exemplary plot of PQS over a predetermined time window corresponding to a single stream switch event, and in FIG. 22(*b*) there is shown an exemplary detection region plot illustrating the amount of quality degradation (e.g., change in PQS) that can be incurred before a viewer perceives a quality change.

The mapping of a quality level Qi or Qi+1 to a particular PQS level can be performed in any suitable manner so that each level corresponds to a perceptible increase or decrease in quality. In general, stream switch events corresponding to a change in operating point may be sufficient to alter the quality of a media stream in a perceptible manner. Accordingly, stream switch events and PQS may be highly correlated. In one example for an adaptive stream, each PQS level may correspond to a progressively higher bit rate of the media stream, with other parameters (e.g., frame rate and pixel resolution) held constant.

In some embodiments, the video quality degradation shown in the example of FIG. 22(*a*) may be determined to be perceptible if a change in PQS is large (e.g., $\Delta PQS \geq 1$) over a short duration (e.g., $\Delta t \geq 1$ s) or, alternatively, if a change in quality is moderate (e.g., $\Delta PQS \geq 0.5$ and $\Delta PQS < 1$) over a long duration ($\Delta t \geq 3$ s).

Many permutations and combinations of $\Delta PQS$ and $\Delta t$ may exist for modeling when changes in quality level will be perceptible.

Referring now to FIG. 22(*b*), there is shown an exemplary detection region plot illustrating the combinations of $\Delta PQS$ and $\Delta t$ that may result in a perceptible quality level change. In particular, the shaded region 705 (i.e., above and to the right of the dotted line) may constitute a combination of $\Delta PQS$ and $\Delta t$ resulting in a perceptible change in PQS. The vertical axis illustrates an absolute value of $\Delta PQS$, as both increases and decreases in quality level may be perceptible. The precise values of $\Delta PQS$ and $\Delta t$ may vary in different embodiments, depending on a variety of factors, such as PQS mapping, video codec, viewer expectations, network capability, etc.

Accordingly, in some embodiments, the output of the detection model can be based on the absolute change in PQS due to the event ($\Delta PQS$) and the duration ($\Delta t$) of the event.

In some cases, a series of changes in PQS (e.g., based on a series of stream switch events) may occur over a relatively brief time period. There may be several approaches that could be applied to determine whether a corresponding quality change event occurs.

In a first approach, each change in PQS may be analyzed independently. If the change in presentation quality level exceeds a predetermined threshold, then the change may be determined to constitute a unique quality change event.

However, this simple approach carries the risk that multiple consecutive increases or decreases in quality may not be determined to constitute a quality change event if the individual increases or decreases do not exceed a predetermined threshold amount.

Accordingly, a second approach may be to view each PQS change relative to the PQS level prior to the start of the series of changes. That is, if the delta in PQS from an initial quality level (Qinitial) exceeds a threshold relative to the Qinitial, then the current change can be determined to constitute a quality change event. Qinitial can be determined at the start of a predetermined time window.

However, this second approach relies on careful selection of the time window. A long time window may result in an otherwise perceptible change in PQS failing to register as a quality change event, if the absolute change in PQS, relative to Qinitial, remains below the predetermined threshold.

Accordingly, a combination approach may also be used. For example, in some embodiments, the initial quality level Qinitial may be used in addition to the immediately preceding quality level Qprev.

Other approaches may also be used to determine detectability and effective change in a perceived quality level in the case of multiple changes in PQS over a short time interval.

Figure 23:
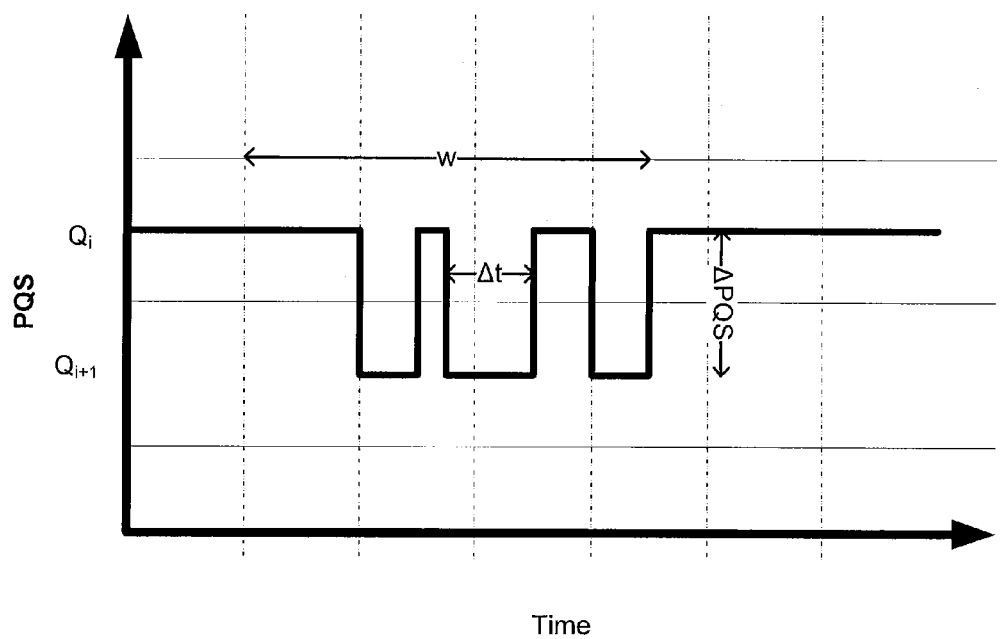
FIG. 23 illustrates an exemplary plot of presentation quality.

Referring now to FIG. 23, there is illustrated a plot of presentation quality during a series of brief changes in PQS. This pattern of changes may be perceived by a viewer even though the individual changes may not be individually perceptible. In the example of FIG. 23, each change may be short (e.g., around 2 s) and the quality change moderate (ΔPQS~=0.5). Nevertheless, the end user may notice a degradation in quality due to the pattern of quality changes occurring over a relatively short time period.

In some embodiments, to detect such events, a predetermined time window 'w' may be defined with a duration of, for example, 10 seconds. The durations of all PQS displacements currently within the sliding window 'w', and for which the absolute value of ΔPQS is greater or equal to 0.5 may be summed. If the total duration exceeds, for example, 3 seconds then a quality change event may be determined to have occurred. The magnitude of a change in quality may be determined, for example, by taking an average of the quality levels during the duration of the stream switches.

Figure 24:
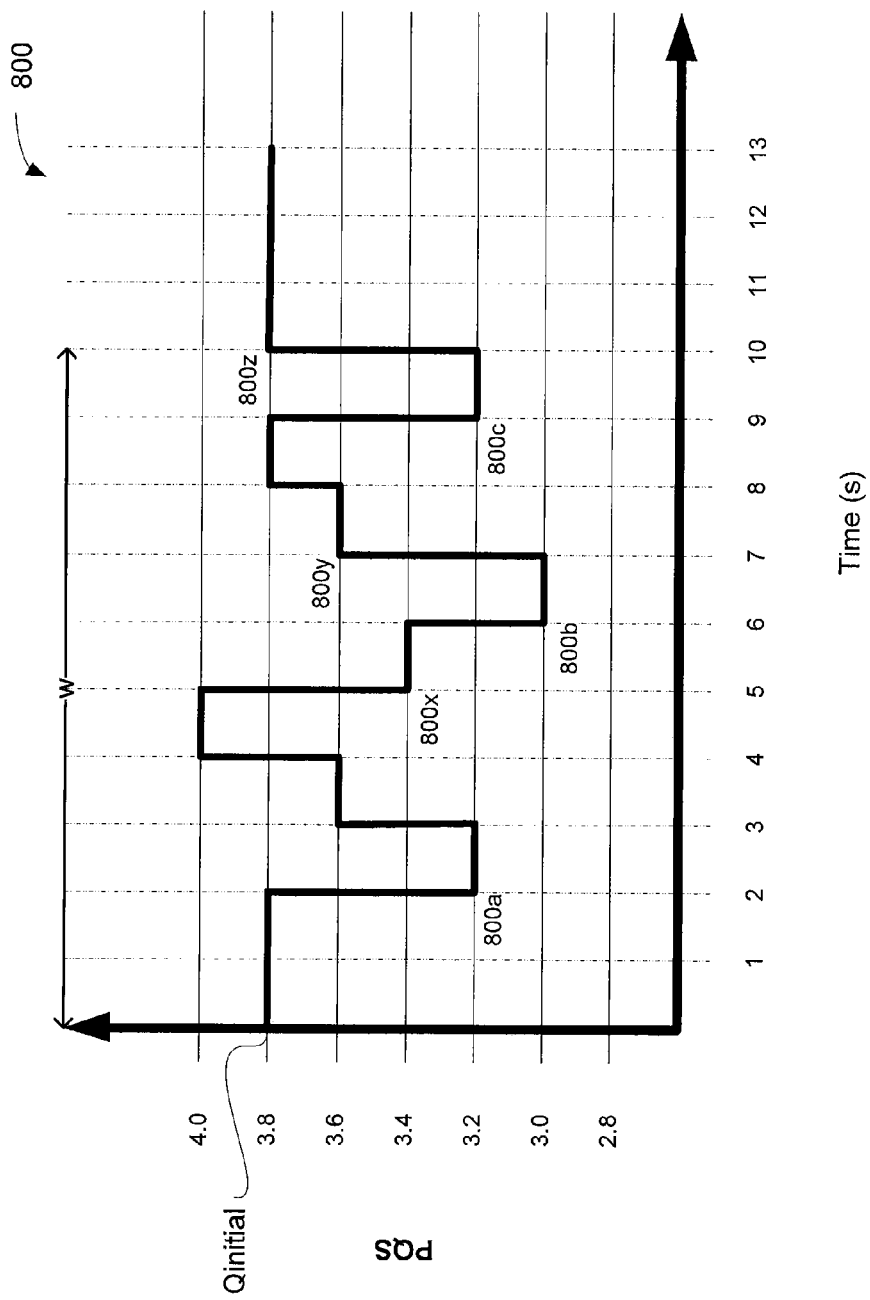
FIG. 24 illustrates an exemplary plot of presentation quality with multiple changes in PQS.

Referring now to FIG. 24, there is illustrated an exemplary plot with multiple changes in PQS.

If the second approach described above is applied, with a quality deviation threshold of ΔPQS>=0.5, then three quality level changes (800a, 800b, 800c) may be detected where ΔPQS deviates by 0.5 or greater from the initial quality level (Qinitial) of 3.8. Accordingly, a quality change event would be determined to occur at times t=2 seconds, t=6 seconds and t=9 seconds.

In addition, using the second approach, the effective quality change (e.g., an average of the PQS level changes that exceeded the quality deviation threshold from Qinitial) may be computed as ΔPQS=(0.6+0.6+0.8)/3=0.67.

However, as described above, it may also be desirable to consider changes in PQS signal occurring within a series of changes, even where the delta relative to the immediate preceding quality level exceeds a threshold amount (but not relative to Qinitial). Choosing the same threshold amount (ΔPQS>=0.5), three additional PQS level changes (800x, 800y, 800z) can be identified where ΔPQS deviates by 0.5 or greater from the preceding quality level. Accordingly, an effective PQS change could be computed as the combination of the changes relative to both initial and preceding quality levels. For example, ΔPQS=f(ΔQinitial, ΔQprev), where ΔQprev is the difference between successive quality changes.

Ramped changes in PQS may be the result of a series of stream switch events that provide a series of quality changes biased in a single direction (i.e., consistently improved quality, or consistently diminished quality) over a period of time.

Figure 25:
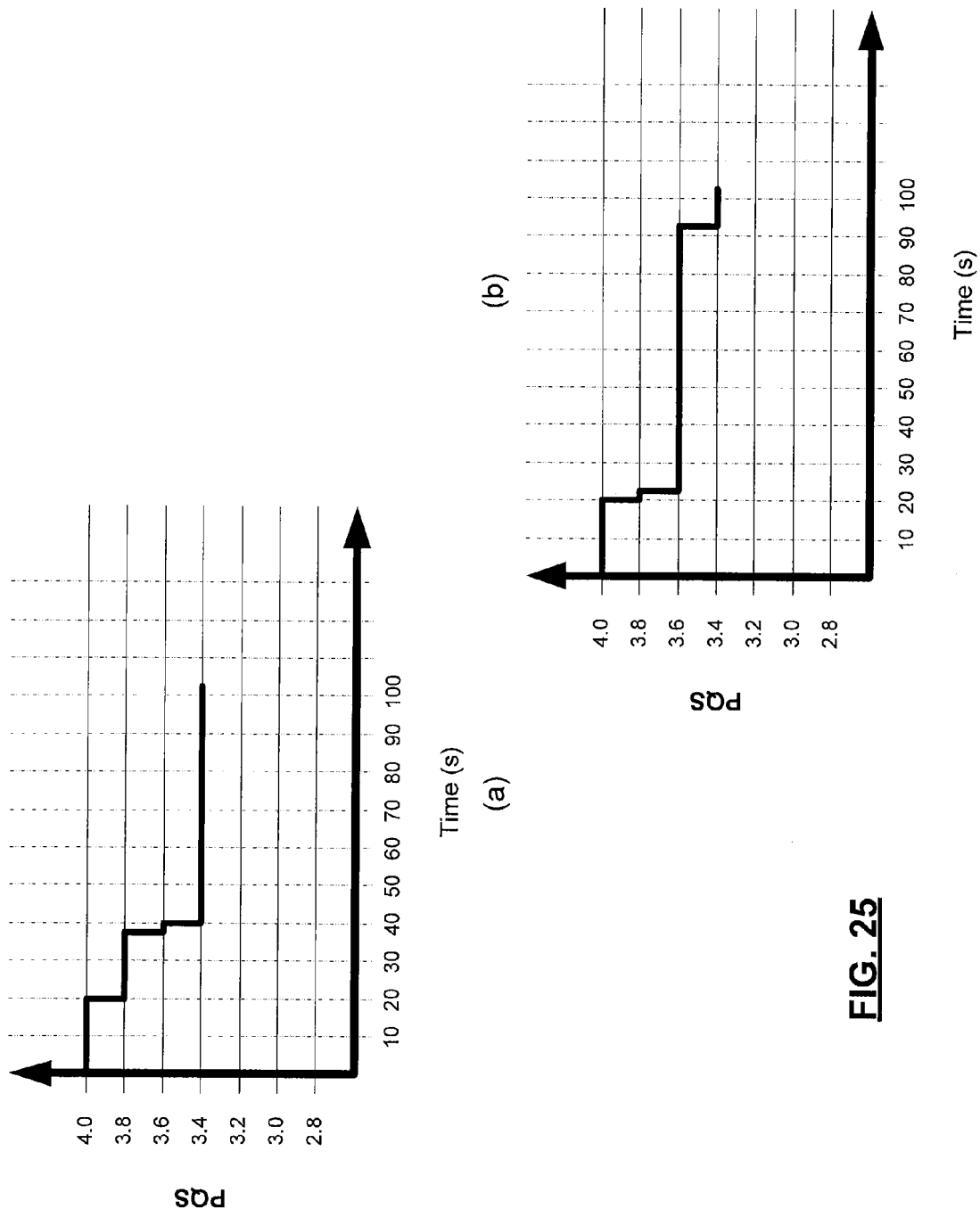
FIGS. 25(a) and 25(b) illustrate two exemplary plots of ramped changes in PQS.

The second approach described above may be suitable for detecting ramped changes. For example, the threshold deviation may be chosen as ΔPQS>=0.5. Referring now to FIGS. 25(a) and 25(a), there are illustrated two exemplary ramped changes. In the first example of FIG. 25(a), a quality change event is detected at t=40 seconds, with a corresponding ΔPQS=0.6 relative to Qinitial (4.0). In the second example of FIG. 25(b), even though the quality remains at a relatively consistent level, with any changes in PQS remaining below the threshold, for most of the time interval, a perceptible quality change event can nevertheless be detected at t=92 seconds, again with a corresponding ΔPQS=0.6 relative to Qinitial.

As with single and multiple scenarios, additional methods for determining the perceptibility, effective location, and effective duration of stream switch events in a ramped stream switch scenario are possible.

Referring again to FIG. 18, the computation of an impairment measure, such as DQS_B generated by quality change detection module 530 may be performed as follows. At time t, an impairment value caused by a prior stream switch event at time t, can be modeled as $$\text{DQS impairment}(t) = \text{DQS impairment}(ti) + S(\Delta Q(t_i)) * (t - t_i) \quad \text{EQ12}$$

The $\Delta Q(t_i)$ term represents the change in objective quality level for the stream switch event at time ti, and may be based on an objective measure of subjective quality, e.g. a PQS or other quality score. The slope S may be defined as:

$$S(\Delta Q(t_i)) = \Delta Q(t_i) 2 / T_{delay} \quad \text{EQ13}$$

where $T_{delay}$ is a time constant for the quality level change being noticed. The slope is defined as a function of $\Delta Q(t_i)$ to reflect that greater quality level changes are perceived faster. Variations on this approach and other modeling techniques are possible, in accordance with the described embodiments.

The described embodiments may be used to compute quality scores for a media session delivered using an adaptive streaming protocol, where the quality score may be an estimate of a MOS score. The quality score may reflect the impact of network delivery on a viewer's QoE. In particular, the quality score may be based generally on the effects of stream switch events, as stream switches may be the result of impaired network delivery. Other network events, such as re-buffering events may also be incorporated in the score.

The described embodiments may be configured for specific players and video services.

The described embodiments may provide methods for detecting stream switch events within a media session, including the location of the stream switch within the media session stream, the duration of playback at a given quality level. In addition, methods for detecting playback of specific segments at a given operating point are also described, for detecting concurrent segments and ignoring spurious attempts to switch operating point.

The change in operating point and corresponding change in quality level may be used to determine the impact of network delivery on QoE. Accordingly, the described embodiments may detect and measure changes in operating point and quality level, and apply detection filters to the stream switch events in order to determine the perceptibility of changes in quality level for different stream switch scenarios (e.g., distinguishing non-perceptible stream switches, single perceptible stream switches, multiple stream switches over a short time window, and expected stream switches that do not occur).

While particular combinations of various functions and features have been expressly described herein, other combinations of these features and functions are possible that are not limited by the particular examples disclosed herein are expressly incorporated within the scope of the present invention. In particular, various aspects have been described herein with specific reference to video embodiments, however the described methods, systems and apparatus may also be applied to audio embodiments.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments, a module includes a functional block that is implemented in hardware, software, and/or firmware that performs one or more functions such as the processing of an input signal produce an output signal. As used herein, a module may contain submodules that themselves are modules.

The present invention has been described here by way of example only. Various modification and variations may be made to these exemplary embodiments without departing from the spirit and scope of the invention, which is limited only by the appended claims.

We claim:

1. A method of providing a media stream quality signal, the method comprising:
monitoring, at a network monitoring device, a media stream transmitted in a media streaming session between a transmitting device and a receiving device via a network;
modeling, at the network monitoring device, a video player buffer state of the receiving device based on the media streaming session;
determining, at the network monitoring device, a receiving device playback state of the receiving device based on behavior of the modeled video player buffer state;
based on the modeled video player buffer state and the receiving device playback state, estimating, at the network monitoring device, a location in the media streaming session of a stream switch event, at which the receiving device changes playback from a first operating point to a second operating point of the media stream, wherein the media stream is an adaptive bitrate stream that has a plurality of operating points; and
generating at least one key performance indicator based on the location in the media streaming session of the stream switch event.

2. The method of claim 1, further comprising:
updating a presentation quality signal based on the stream switch event;
determining whether a quality change event has occurred based on at least one property of the presentation quality signal exceeding a predetermined threshold; and
if a quality change event has occurred, updating an adjustment signal based on the presentation quality signal and the quality change event.

3. The method of claim 2, further comprising updating a delivery quality signal for the media streaming session based on the adjustment signal.

4. The method of claim 3, further comprising:
updating a user model state based on the receiving device playback state; and
updating the adjustment signal based on the user model state.

5. The method of claim 4, wherein the user model state is determined based on one or more playback events selected from the group consisting of a frequency of re-buffering events, a duration of re-buffering events, an event location within the media stream, a duration of the media streaming session, a start-up delay for the media streaming session and a type of the media streaming session.

6. The method of claim 4, wherein the user model state is determined based at least on the stream switch event.

7. The method of claim 3, wherein the predetermined threshold is based on one or more parameters selected from the group consisting of: a duration of a change in the presentation quality signal; a magnitude of a change in the presentation quality signal; a rate of change in the presentation quality signal in a predetermined time window; and combinations thereof.

8. The method of claim 2, wherein determining whether the quality change event has occurred is further based on a configuration parameter associated with the media streaming session.

9. The method of claim 8, wherein the configuration parameter is a receiving device configuration parameter.

10. The method of claim 8, wherein the configuration parameter is a transmitting device configuration parameter.

11. The method of claim 2, further comprising:
determining that the presentation quality signal has not changed in a predetermined period;
determining whether the operating point corresponds to a best operating point for the media stream; and
if the operating point does not correspond to the best operating point, update the adjustment signal.

12. The method of claim 1, further comprising determining that the stream switch event corresponds to a change from a first operating point to a second operating point in the plurality of operating points.

13. The method of claim 12, wherein the plurality of operating points are defined by an operating point characteristic selected from the group consisting of a video resolution, a video bit rate, a video frame rate, an audio sample rate, a number of audio channels, an audio bit rate, a receiving device type, a receiving device screen size, and combinations thereof.

14. The method of claim 1, further comprising:
detecting a re-buffering event in the media streaming session; and
generating the at least one key performance indicator based on the re-buffering event.

15. The method of claim 14, wherein the at least one key performance indicator is selected from the group consisting of a number of re-buffering events, a location in the media stream, a duration of re-buffering events, and a start-up delay for the media streaming session.

16. The method of claim 1, wherein the at least one key performance indicator selected from the group consisting of a number of stream switch events, a location in the media stream, a duration of the stream switch event, and a change in operating point for the stream switch event.

17. An apparatus for providing a media stream quality signal, the apparatus comprising a memory and a processor, the processor configured to:
monitor a media stream transmitted in a media streaming session between a transmitting device and a receiving device via a network;
model, at the network monitoring device, a video player buffer state of the receiving device based on the media streaming session;
determine, at the network monitoring device, a receiving device playback state of the receiving device based on behavior of the modeled video player buffer state;
based on the modeled video player buffer state and the receiving device playback state, estimate, at the network monitoring device, a location in the media streaming session of a stream switch event, at which the receiving device changes playback from a first operating point to a second operating point of the media stream, wherein the media stream is an adaptive bitrate stream that has a plurality of operating points; and generate at least one key performance indicator based on the location in the media streaming session of the stream switch event.

18. The apparatus of claim 17, wherein the processor is further configured to:
update a presentation quality signal based on the stream switch event;
determine whether a quality change event has occurred based on at least one property of the presentation quality signal exceeding a predetermined threshold; and
if a quality change event has occurred, update an adjustment signal based on the presentation quality signal and the quality change event.

19. The apparatus of claim 18, wherein the processor is further configured to update a delivery quality signal based on the adjustment signal.

20. The apparatus of claim 16, wherein the processor is further configured to:
update a user model state based on the receiving device playback state; and
update the adjustment signal based on the indication based on the receiving device playback state.

21. The apparatus of claim 20, wherein the user model state is determined based on one or more playback events selected from the group consisting of a frequency of re-buffering events, a duration of re-buffering events, a re-buffering location within the media stream, a duration of the media streaming session, a start-up delay for the media streaming session and a type of the media streaming session.

22. The apparatus of claim 20, wherein the user model state is determined based at least on the stream switch event.

23. The apparatus of claim 19, wherein the predetermined threshold is based on one or more parameters selected from the group consisting of: a duration of a change in the presentation quality signal; a magnitude of a change in the presentation quality signal; a rate of change in the presentation quality signal in a predetermined time window; and combinations thereof.

24. The apparatus of claim 18, wherein determining whether the quality change event has occurred is further based on a configuration parameter associated with the media streaming session.

25. The apparatus of claim 24, wherein the configuration parameter is a receiving device configuration parameter.

26. The apparatus of claim 24, wherein the configuration parameter is a transmitting device configuration parameter.

27. The apparatus of claim 18, wherein processor is further configured to:
determine that the presentation quality signal has not changed in a predetermined period;
determine whether the operating point corresponds to a best operating point for the media stream; and
if the operating point does not correspond to the best operating point, update the adjustment signal.

28. The apparatus of claim 18, wherein the processor is further configured to:
detect a re-buffering event in the media streaming session; and
generate the at least one key performance indicator based on the re-buffering event.

29. The apparatus of claim 28, wherein the at least one key performance indicator is selected from the group consisting of a number of re-buffering events, a location in the media stream, a duration of re-buffering events, and a start-up delay for the media streaming session.

30. The apparatus of claim 17, wherein the processor is further configured to determine that the stream switch event corresponds to a change from a first operating point to a second operating point in the plurality of operating points.

31. The apparatus of claim 30, wherein the plurality of operating points are defined by an operating point characteristic selected from the group consisting of a video resolution, a video bit rate, a video frame rate, an audio sample rate, a number of audio channels, an audio bit rate, a receiving device type, a receiving device screen size, and combinations thereof.

32. The apparatus of claim 17, wherein the at least one key performance indicator is selected from the group consisting of a number of stream switch events, a location in the media stream, a duration of the stream switch event, and a change in operating point for the stream switch event.

* * * * *